United States Patent
Ahn et al.

(10) Patent No.: US 12,489,054 B2
(45) Date of Patent: Dec. 2, 2025

(54) SEMICONDUCTOR MEMORY DEVICE HAVING BIT LINES WITH DIFFERENT HEIGHT

(71) Applicant: Samsung Electronics Co., Ltd., Suwon-si (KR)

(72) Inventors: Junhyeok Ahn, Suwon-si (KR); Myeong-Dong Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 557 days.

(21) Appl. No.: 18/047,704

(22) Filed: Oct. 19, 2022

(65) Prior Publication Data

US 2023/0298999 A1  Sep. 21, 2023

(30) Foreign Application Priority Data

Mar. 21, 2022 (KR) .................. 10-2022-0034976

(51) Int. Cl.
*H10B 12/00* (2023.01)
*H01L 21/762* (2006.01)
*H01L 23/528* (2006.01)
*H01L 23/532* (2006.01)

(52) U.S. Cl.
CPC .... *H01L 23/5283* (2013.01); *H01L 21/76224* (2013.01); *H01L 23/53271* (2013.01); *H01L 23/53295* (2013.01); *H10B 12/482* (2023.02); *H10B 12/485* (2023.02); *H10B 12/315* (2023.02); *H10B 12/34* (2023.02)

(58) Field of Classification Search
CPC ...... H10B 12/09; H10B 12/315; H10B 12/34; H10B 12/482; H10B 12/485; H10B 12/50; G11C 11/4097

USPC ................................. 257/906, 908
See application file for complete search history.

(56) References Cited

U.S. PATENT DOCUMENTS

| | | |
|---|---|---|
| 8,906,763 B2 | 12/2014 | Park et al. |
| 8,953,356 B2 | 2/2015 | Han et al. |
| 9,230,853 B2 | 1/2016 | Yu et al. |
| 9,379,004 B1 | 6/2016 | Kwon et al. |
| 9,379,114 B2 | 6/2016 | Jeong et al. |
| 9,627,253 B2 | 4/2017 | Kim |
| 9,953,985 B2 | 4/2018 | Kim et al. |
| 10,879,248 B2 | 12/2020 | Choi et al. |

(Continued)

FOREIGN PATENT DOCUMENTS

| | | |
|---|---|---|
| CN | 113410234 A | 9/2021 |
| CN | 113517218 A | 10/2021 |

(Continued)

*Primary Examiner* — Hoai V Pham
(74) *Attorney, Agent, or Firm* — Fish & Richardson P.C.

(57) ABSTRACT

A semiconductor memory device may include a device isolation pattern in a substrate and defining a first active section of the substrate and a second active section of the substrate, a first bit line crossing the center of the first active section, a second bit line crossing a center of the second active section, a bit-line contact between the first bit line and a center of the first active section, and a storage node pad on an end of the second active section. The first and second active sections may be spaced apart from each other. The center of the first active section may be adjacent to the end of the second active section. A level of a bottom surface of the first bit line may be lower than a level of a bottom surface of the second bit line.

20 Claims, 31 Drawing Sheets

(56) References Cited

U.S. PATENT DOCUMENTS

| | | |
|---|---|---|
| 10,943,922 B2 | 3/2021 | Kim et al. |
| 11,056,494 B2 | 7/2021 | Tomoyama |
| 11,114,440 B2 | 9/2021 | Song et al. |
| 2021/0202691 A1 | 7/2021 | Park et al. |
| 2021/0296237 A1 | 9/2021 | Kim et al. |
| 2021/0335795 A1 | 10/2021 | Wan |
| 2022/0085025 A1 | 3/2022 | Lim et al. |
| 2023/0123510 A1* | 4/2023 | Yang ................ H01L 21/31144 438/421 |

FOREIGN PATENT DOCUMENTS

| | | |
|---|---|---|
| KR | 20150027363 A | 3/2015 |
| KR | 20170003830 A | 1/2017 |

* cited by examiner

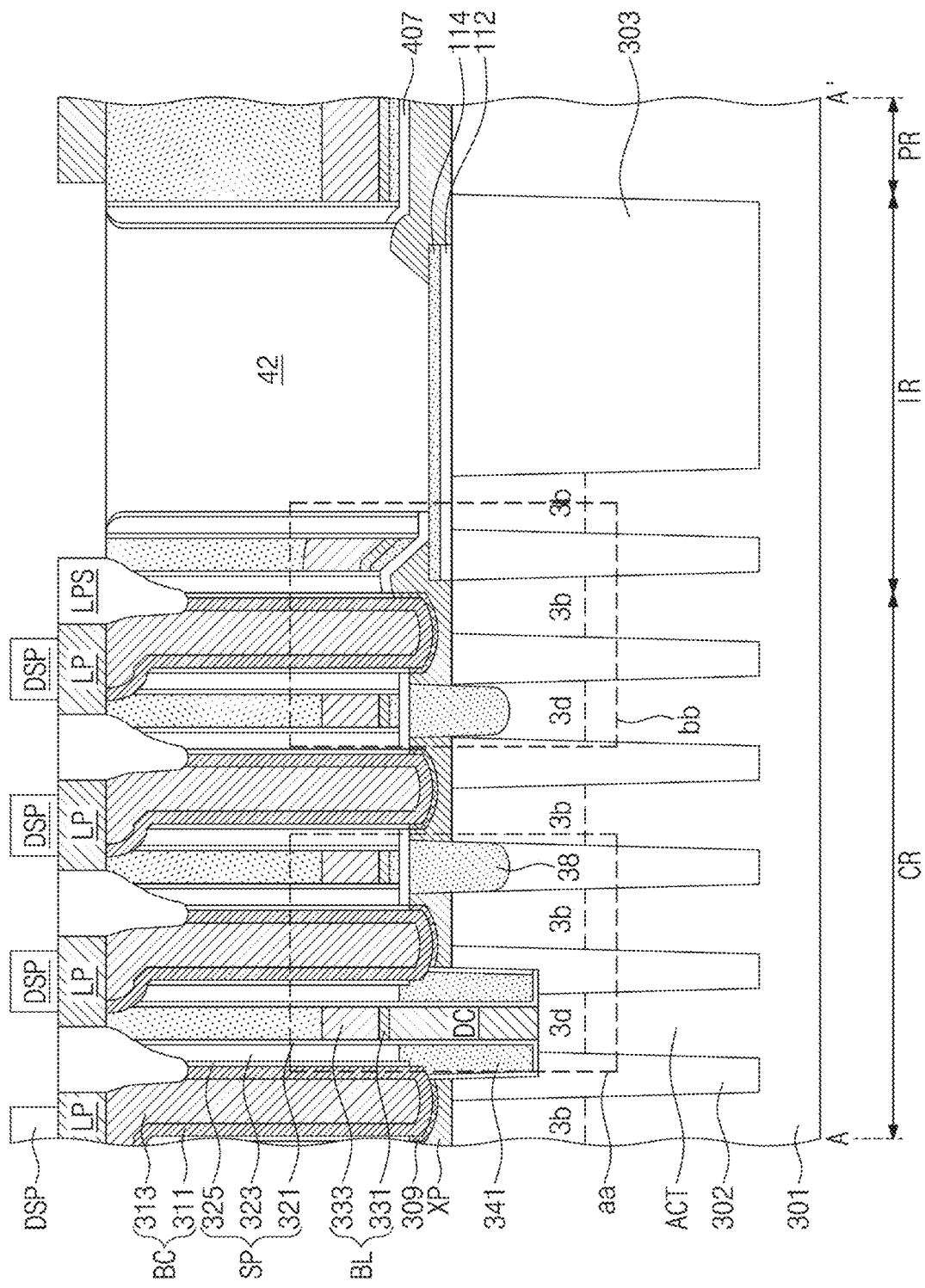

SEMICONDUCTOR MEMORY DEVICE HAVING BIT LINES WITH DIFFERENT HEIGHT

CROSS-REFERENCE TO RELATED APPLICATION

This U.S. nonprovisional application claims priority under 35 U.S.C § 119 to Korean Patent Application No. 10-2022-0034976, filed on Mar. 21, 2022 in the Korean Intellectual Property Office, the disclosure of which is hereby incorporated by reference in its entirety.

BACKGROUND

Inventive concepts relate to a semiconductor memory device.

Semiconductor devices are beneficial in the electronic industry because of their small size, multi-functionality, and/or low fabrication cost. Semiconductor devices have increasingly integrated with the development of electronic industry. Line widths of patterns of semiconductor devices are being reduced for high integration thereof. However, new exposure techniques and/or expensive exposure techniques may be required for fine patterns such that it may be difficult to highly integrate semiconductor devices. Various studies have thus recently been conducted for new integration techniques.

SUMMARY

Some embodiments of inventive concepts provide a semiconductor memory device with increased reliability.

Some embodiments of inventive concepts provide a method of fabricating a semiconductor memory device with increased reliability.

According to some embodiments of inventive concepts, a semiconductor memory device may include a substrate; a device isolation pattern in the substrate, the device isolation pattern defining a first active section of the substrate and a second active section of the substrate that are spaced apart from each other, a center of the first active section being adjacent to an end of the second active section; a first bit line crossing the center of the first active section; a second bit line crossing the second active section; a bit-line contact between the first bit line and the center of the first active section; and a storage node pad on the end of the second active section. A level of a bottom surface of the first bit line may be lower than a level of a bottom surface of the second bit line.

According to some embodiments of inventive concepts, a semiconductor memory device may include a substrate; a device isolation pattern in the substrate, the device isolation pattern defining a first active section of the substrate and a second active section of the substrate that are spaced apart from each other, a center of the first active section being adjacent to an end of the second active section; a first bit line crossing the center of the first active section; a second bit line crossing a center of the second active section; a bit-line contact between the first bit line and the center of the first active section; and a storage node pad on the end of the second active section. A height of first bit line from a top surface of the substrate and may be different from a height of the second bit line from the top surface of the substrate.

According to some embodiments of inventive concepts, a semiconductor memory device may include a substrate including a cell array region and an interface region; a device isolation pattern on the cell array region, the device isolation pattern defining a first active section of the substrate, a second active section of the substrate, and a third active section of the substrate, a center of the first active section being adjacent to an end of the second active section, and the third active section being adjacent to the interface region; a first bit line crossing the center of the first active section; a second bit line crossing a center of the second active section; a third bit line crossing a center of the third active section; a bit-line contact between the first bit line and the center of the first active section; a first storage node pad on the end of the second active section; and a second storage node pad on an end of the third active section. A thickness of the second storage node pad may be greater than a thickness of the first storage node pad. A level of a bottom surface of the first bit line may be lower than a level of a bottom surface of the second bit line. The first active section, the second active section, and the third active section may be spaced apart from each other.

BRIEF DESCRIPTION OF THE DRAWINGS

FIG. 3A illustrates a cross-sectional view taken along line A-A' of FIG. 2 according to some embodiments of inventive concepts.

FIGS. 6A to 6K and 6M to 6Q illustrate cross-sectional views showing a method of fabricating a semiconductor memory device of FIG. 3A according to some embodiments of inventive concepts.

DETAILED DESCRIPTION

Expressions such as "at least one of," when preceding a list of elements, modify the entire list of elements and do not modify the individual elements of the list. For example, "at least one of A, B, and C," and similar language (e.g., "at least one selected from the group consisting of A, B, and C") may be construed as A only, B only, C only, or any combination of two or more of A, B, and C, such as, for instance, ABC, AB, BC, and AC.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Some embodiments of inventive concepts will now be described in detail with reference to the accompanying drawings to aid in clearly explaining inventive concepts.

Figure 1:
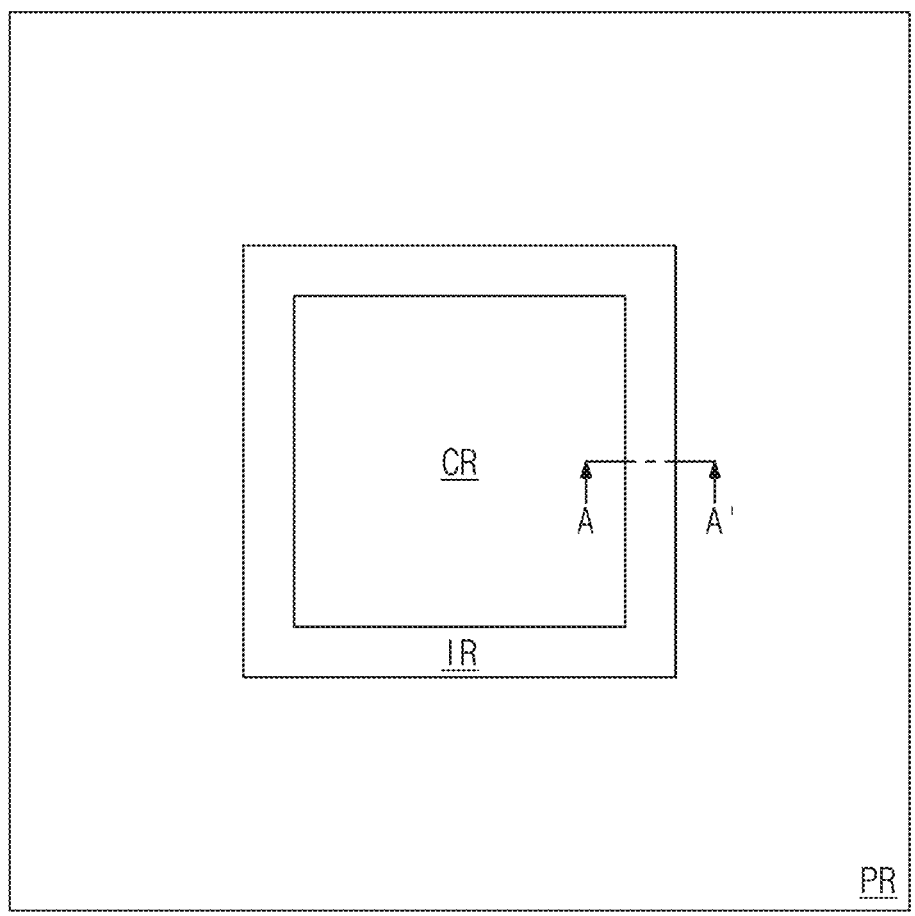
FIG. 1 illustrates a simplified layout showing a semiconductor memory device according to some embodiments of inventive concepts.
Figure 2:
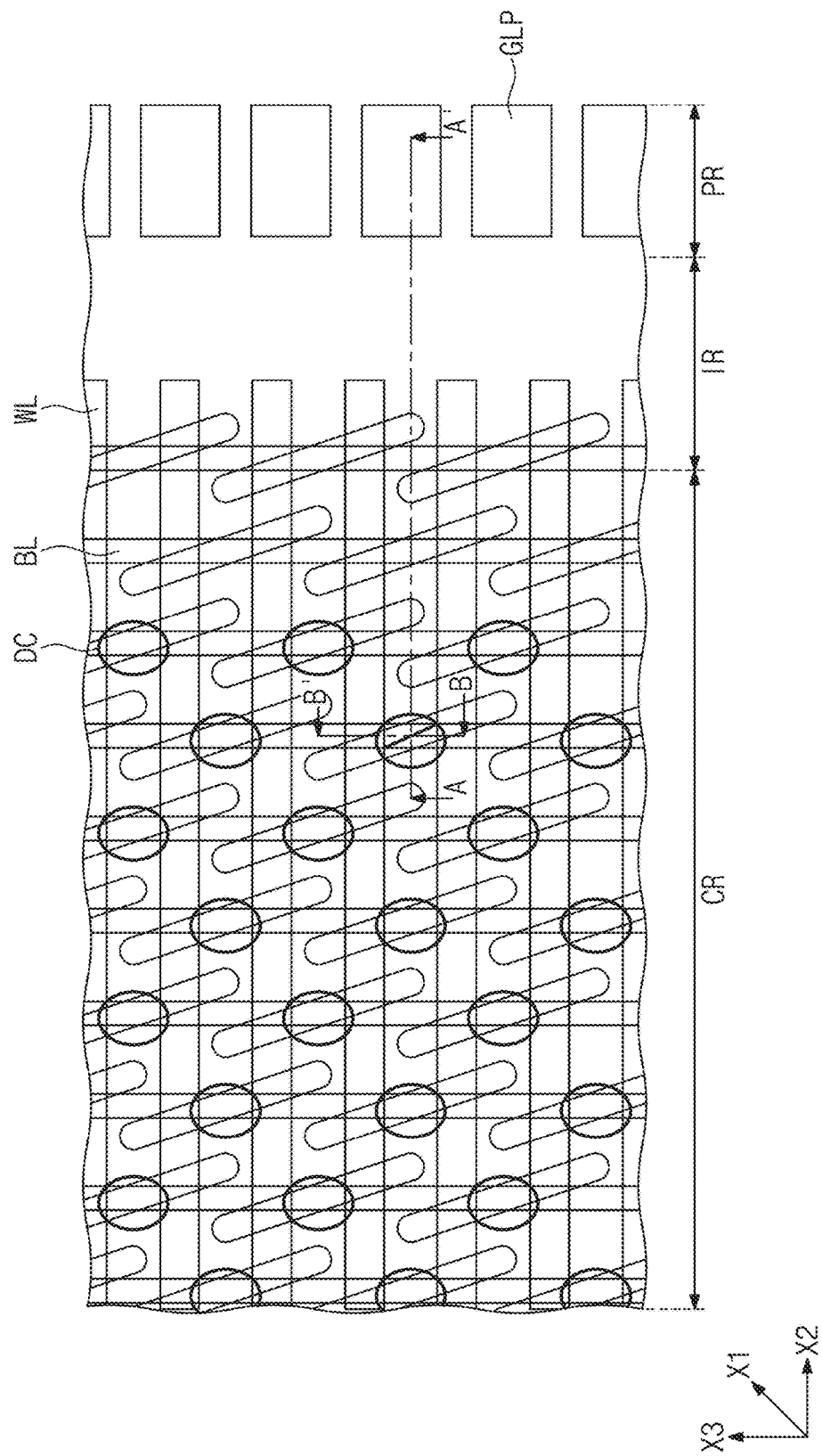
FIG. 2 illustrates a plan view showing a semiconductor memory device according to some embodiments of inventive concepts.
Figure 3B:
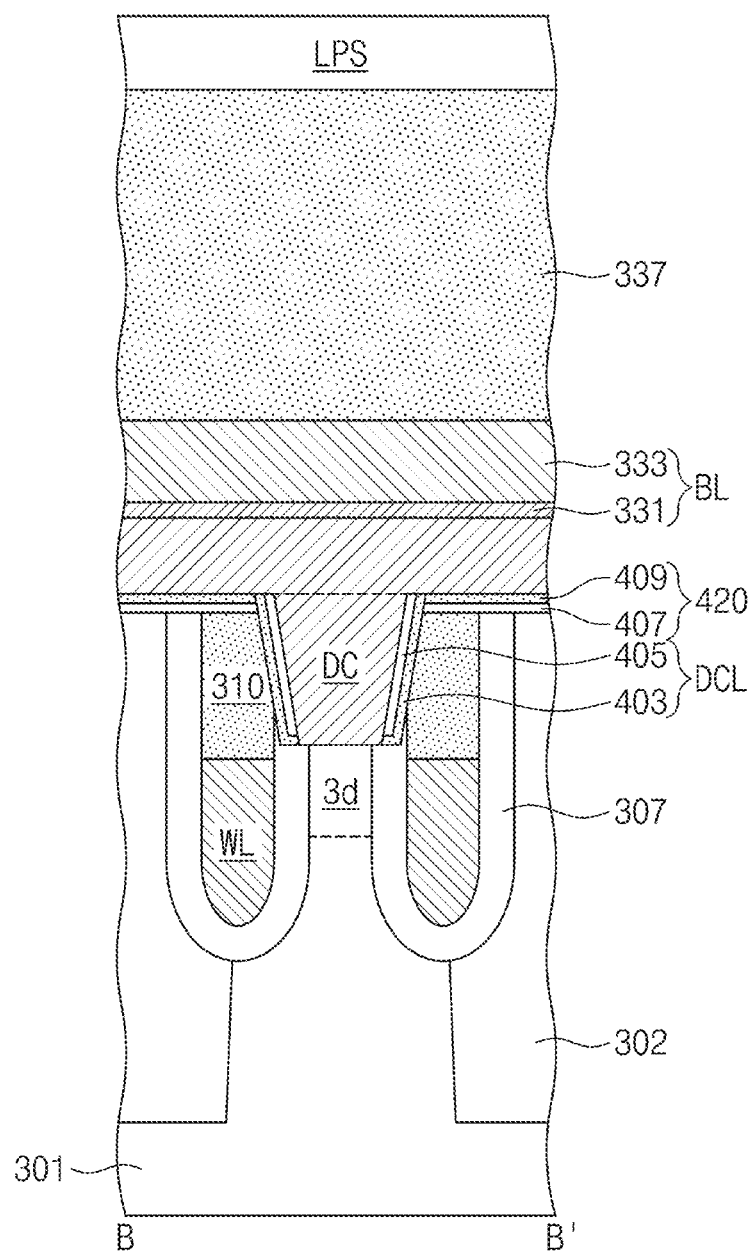
FIG. 3B illustrates a cross-sectional view taken along line B-B' of FIG. 2 according to some embodiments of inventive concepts.

FIG. 1 illustrates a simplified layout showing a semiconductor memory device according to some embodiments of inventive concepts. FIG. 2 illustrates a plan view showing a semiconductor memory device according to some embodiments of inventive concepts. FIG. 3A illustrates a cross-sectional view taken along line A-A' of FIG. 2 according to some embodiments of inventive concepts. FIG. 3B illustrates a cross-sectional view taken along line B-B' of FIG. 2 according to some embodiments of inventive concepts.

Referring to FIG. 1, in some embodiments, a semiconductor memory device may be a dynamic random access memory (DRAM) device. Memory cell circuits, such as memory integrated circuits, may be provided on a cell array region CR, which will be discussed below. Peripheral circuits, such as transistors, may be provided on a peripheral circuit region PR, which will be discussed below. For example, the peripheral circuits may include sense amplifier circuits, sub-word line driver circuits, and so forth. The peripheral circuits may further include power and ground driver circuits for driving sense amplifiers.

Referring to FIGS. 2, 3A, and 3B, a substrate 301 may be provided. The substrate 301 may include a cell array region CR, a peripheral circuit region PR, and an interface region IR between the cell array region CR and the peripheral circuit region PR. On the interface region IR, a regional isolation pattern 303 may be disposed to separate the peripheral circuit region PR and the cell array region CR from each other. A first diffusion barrier layer 112 and a second diffusion barrier layer 114 may be disposed on the regional isolation pattern 303.

The substrate 301 may include a semiconductor material. For example, the substrate 301 may be a silicon substrate, a germanium substrate, or a silicon-germanium substrate. On the cell array region CR, the substrate 301 may be provided therein with device isolation patterns 302 that define active sections ACT. Each of the active sections ACT may have an isolated shape. When viewed in plan, each of the active sections ACT may have a bar shape elongated along a first direction X1. When viewed in plan, the active sections ACT may correspond to portions of the substrate 301 that are surrounded by the device isolation patterns 302. The active sections ACT may be arranged in parallel to each other in the first direction X1 such that one of the active sections ACT may have an end portion adjacent to a central portion of a neighboring one of the active sections ACT. Each of the device isolation patterns 302 may have a single-layered or multi-layered structure formed of at least one selected from, for example, silicon oxide, silicon oxynitride, and silicon nitride.

Word lines WL may run across the active sections ACT. The word lines WL may be disposed in grooves formed in the device isolation patterns 302 and the active sections ACT. The word lines WL may be parallel to a second direction X2 that intersects the first direction X1. The word lines WL may be formed of a conductive material. A gate dielectric layer 307 may be disposed between each of the word lines WL and an inner surface of each groove. Although not shown, the grooves may have their bottom surfaces located relatively deeper in the device isolation patterns 302 and relatively shallower in the active sections ACT. The gate dielectric layer 307 may include at least one selected from thermal oxide, silicon nitride, silicon oxynitride, and high-k dielectric. The word lines WL may have their curved bottom surfaces.

A first impurity region 3d may be disposed in each active section ACT between a pair of word lines WL, and a pair of second impurity regions 3b may be correspondingly disposed in opposite edge portions of each active section ACT. The first impurity region 3d may correspond to a common source region, and the second impurity regions 3b may correspond to drain regions. A transistor may be constituted by each of the word lines WL and its adjacent first and second impurity regions 3d and 3b. As the word lines WL are disposed in the grooves, each of the word lines WL may have thereunder a channel region whose length becomes increased within a limited planar area.

The word lines WL may have their top surfaces lower than those of the active sections ACT. A word-line capping pattern 310 may be disposed on each of the word lines WL. The word-line capping patterns 310 may have their linear shapes that extend along longitudinal directions of the word lines WL, and may cover entire top surfaces of the word lines WL. The grooves may have inner spaces not occupied by the word lines WL, and the word-line capping patterns 310 may fill the unoccupied inner spaces of the grooves. The word-line capping patterns 310 may be formed of, for example, a silicon nitride layer. A gate dielectric layer 307 may extend between the word-line capping pattern 310 and the device isolation pattern 302 and between the word-line capping pattern 310 and the substrate 301.

Bit lines BL may be disposed on the substrate 301. The bit lines BL may run across the word-line capping patterns 310 and the word lines WL. As disclosed in FIG. 2A, the bit lines BL may be parallel to a third direction X3 that intersects the first and second directions X1 and X2. The bit line BL may include a bit-line diffusion barrier pattern 331 and a bit-line wire pattern 333 that are sequentially stacked. The bit-line diffusion barrier pattern 331 may include at least one selected from titanium, titanium nitride (TiN), titanium silicon nitride (TiSiN), tantalum, tantalum nitride, and tungsten nitride. The bit-line wire pattern 333 may include metal, such as tungsten, aluminum, copper, ruthenium, or iridium. A bit-line capping pattern 337 may be disposed on each of the bit lines BL. The bit-line capping patterns 337 may be formed of a dielectric material, such as a silicon nitride layer.

A storage node pad XP may be disposed on the active section ACT doped with the second impurity region 3b. The storage node pad XP may include, for example, impurity-doped polysilicon.

A pad isolation pattern 38 may be interposed between the storage node pads XP. For example, the pad isolation pattern 38 may include silicon nitride. An interlayer dielectric layer 420 may be provided on the storage node pads XP and the pad isolation pattern 38. The interlayer dielectric layer 420 may include first and second interlayer dielectric layers 407 and 409 that are sequentially stacked. The second interlayer dielectric layer 409 may have a sidewall aligned with that of the bit line BL. The first interlayer dielectric layer 407 may have a width greater than that of the second interlayer dielectric layer 409. The first interlayer dielectric layer 407 may have a sidewall aligned with that of a first spacer 323 which will be discussed below. The first and second interlayer dielectric layers 407 and 409 may include their dielectric materials having an etch selectivity with respect to each other. The first and second interlayer dielectric layers 407 and 409 may include different materials from each other. For example, the first interlayer dielectric layer 407 may include silicon oxide. The second interlayer dielectric layer 409 may include silicon nitride.

Bit-line contacts DC may be disposed in recess regions that intersect the bit lines BL. The bit-line contacts DC may include polysilicon. The bit-line contacts DC may include impurity-doped polysilicon or impurity-undoped polysilicon. The bit-line contact DC may electrically connect the first impurity region 3d and the bit line BL to each other. The recess region may have an empty space not occupied by the bit-line contact DC, and a buried dielectric pattern 341 may occupy the empty space of the recess region. The buried dielectric pattern 341 may include a silicon nitride layer or a silicon oxynitride layer.

The bit line BL and the bit-line capping pattern 337 may have their sidewalls covered with a bit-line spacer SP. The bit-line spacer SP may include a spacer liner 321, a first spacer 323, and a second spacer 325. The spacer liner 321, the first spacer 323, and the second spacer 325 may independently include one of silicon oxide, silicon nitride, silicon oxynitride, and silicon oxycarbide (SiOC). For example, the spacer liner 321 and the first spacer 323 may include the same material, for example, silicon oxide. Alternatively, the spacer liner 321 may include a material having an etch selectivity with respect to the first spacer 323, and in this case, the spacer liner 321 may include silicon nitride and the first spacer 323 may include silicon oxide. The second spacer 325 may include a dielectric material, such as silicon nitride, having an etch selectivity with respect to the first spacer 323. For example, the spacer liner 321 may include silicon oxide. The spacer liner 321 may extend to conformally cover an inner sidewall and a bottom surface of the recess region, or a sidewall of the bit-line contact DC and a sidewall of the storage node pad XP. The buried dielectric pattern 341 may be positioned on the spacer liner 321, filling the recess region. The second spacer 325 may have a bottom end lower than that of the first spacer 323.

Figure 4A:
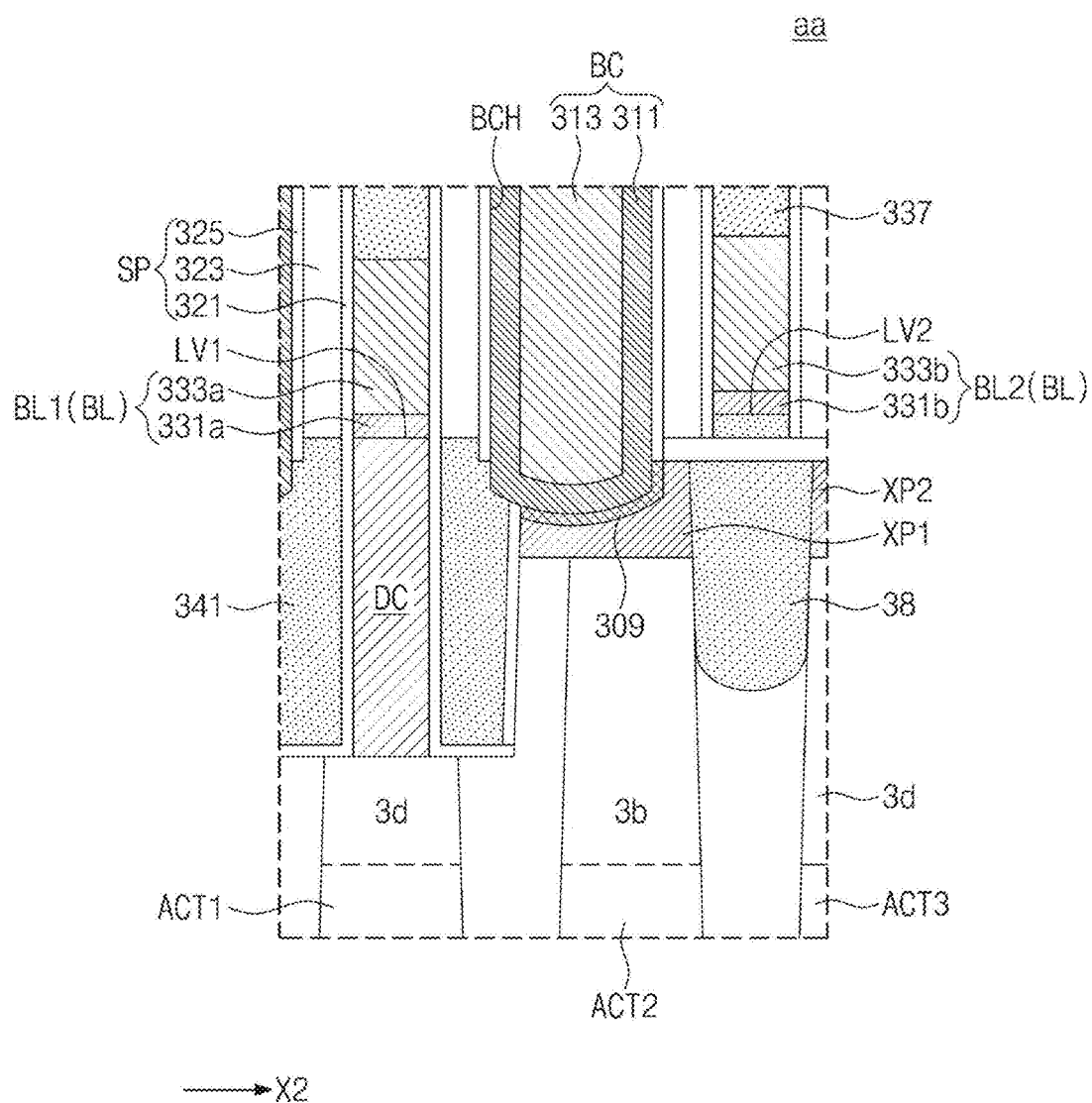
FIG. 4A illustrates an enlarged view showing section aa of FIG. 3A.

A storage node contact BC may be interposed between neighboring bit lines BL, for example, between a first bit line BL1 and a second bit line BL2 shown in FIGS. 3A and 4A. The storage node contact BC may be disposed in a storage node contact hole BCH between neighboring bit lines BL.

Although not shown, a plurality of node isolation patterns may be disposed between neighboring bit-line spacers SP. The node isolation patterns may be spaced apart from each other while being arrange in one row between the bit-line spacers SP. The node isolation patterns may overlap the word lines WL. The storage node contact holes BCH may be defined between the bit-line spacers SP and between the node isolation patterns. The node isolation patterns may include a dielectric material, such as silicon oxide.

The storage node contact BC may include a contact metal pattern 313 and a contact diffusion barrier pattern 311 that surrounds a sidewall and a bottom surface of the contact metal pattern 313. The contact diffusion barrier pattern 311 may have a uniform thickness irrespective of position or may conformally cover a sidewall and a bottom surface of the storage node contact hole BCH. Both of the contact metal pattern 313 and the contact diffusion barrier pattern 311 may include metal. The contact diffusion barrier pattern 311 may include, for example, at least one selected from titanium, titanium nitride (TiN), titanium silicon nitride (TiSiN), tantalum, tantalum nitride, and tungsten nitride. The contact metal pattern 313 may include metal, such as tungsten, aluminum, or copper. The contact diffusion barrier pattern 311 may be rounded at its bottom surface. The contact metal pattern 313 may also be rounded at its bottom surface.

A contact ohmic layer 309 may be interposed between the storage node contact BC and the storage node pad XP. The contact ohmic layer 309 may include metal silicide, such as cobalt silicide. The contact ohmic layer 309 may have a rounded cross-section. Alternatively, the contact ohmic layer 309 may have a rounded bottom surface. The storage node pad XP may be rounded at a contact surface (or top surface) in contact with the contact ohmic layer 309.

Landing pads LP may be positioned on corresponding storage node contacts BC. The landing pads LP may have isolated island shapes when viewed in plan. Six landing pads LP that surround one landing pad LP may constitute a regular hexagonal shape. The landing pads LP may be arranged to form a honeycomb shape.

Data storage patterns DSP may be disposed on corresponding landing pads LP. The data storage patterns DSP may each be a capacitor including a bottom electrode, a dielectric layer, and a top electrode. In this case, the semiconductor memory device may be a dynamic random access memory (DRAM). Alternatively, the data storage patterns DSP may each include a magnetic tunnel junction pattern. In this case, the semiconductor memory device may be a magnetic random access memory (MRAM). In some embodiments, the data storage patterns DSP may each include a phase change material or a variable resistance material. In this case, the semiconductor memory device may be a phase change random access memory (PRAM) or a resistive random access memory (ReRAM).

As shown in the B-B' cross-section of FIG. 3B, the bit line BL may be provided thereunder with a contact dielectric pattern DCL interposed between the bit-line contact DC and the pad isolation pattern 38. The contact dielectric pattern DCL may include a first contact dielectric pattern 403 and a second contact dielectric pattern 405. The first contact dielectric pattern 403 may be in contact with a sidewall of the pad isolation pattern 38 and a sidewall of the interlayer dielectric layer 420. The second contact dielectric pattern 405 may be in contact with the sidewall of the bit-line contact DC. The first contact dielectric pattern 403 may cover a bottom surface of the second contact dielectric pattern 405. The first contact dielectric pattern 403 and the second contact dielectric pattern 405 may include different materials from each other. For example, the first contact dielectric pattern 403 may include silicon nitride, and the second contact dielectric pattern 405 may include silicon oxide.

FIG. 4A illustrates an enlarged view showing section aa of FIG. 3A. Referring to FIGS. 3A and 4A, a first active section ACT1, a second active section ACT2, and a third active section ACT3 may be disposed in one row along the second direction X2. The first impurity region 3d may be formed on the first active section ACT1. The bit-line contact DC may cover a top surface of the first active section ACT1. The second impurity region 3b may be formed on the second active section ACT2. The first impurity region 3d may be formed on the third active section ACT3. A first storage node pad XP1 may cover the device isolation pattern 302 and a top surface of the second active section ACT2. A second storage node pad XP2 may cover the device isolation pattern 302 and a top surface of the third active section ACT3. The pad isolation pattern 38 may be interposed between neighboring first and second storage node pads XP1 and XP2. The pad isolation pattern 38 may have a lower portion lower than a bottom end of each of the first and second storage node pads XP1 and XP2. According to some embodiments, the pad isolation pattern 38 may have a top surface coplanar with those of the first and second storage node pads XP1 and XP2. As shown in FIG. 4A, the first bit line BL1 may be positioned on the bit-line contact DC that covers the firs impurity region 3d of the first active section ACT1. The second bit line BL2, adjacent to the first bit line BL1, may be positioned on and vertically overlap the pad isolation pattern 38. The storage node contact BC may be interposed between neighboring bit lines BL, for example, between the first and second bit lines BL1 and BL2 shown in FIG. 4A. The storage node contact BC may be disposed in the storage node contact hole BCH between neighboring bit lines BL.

The first bit line BL1 may have a bottom surface at a level LV1 lower than a level LV2 of a bottom surface of the second bit line BL2.

The first bit line BL1 may include a first bit-line diffusion barrier pattern 331a and a first bit-line wire pattern 333a that are sequentially stacked. The second bit line BL2 may include a second bit-line diffusion barrier pattern 331b and a second bit-line wire pattern 333b that are sequentially stacked.

The first and second bit-line diffusion barrier patterns 331a and 331b may include the same first metallic material, and the first and second bit-line wire patterns 333a and 333b may include the same second metallic material. The second bit-line diffusion barrier pattern 331b may be in contact with an uppermost portion of the interlayer dielectric layer 420. For example, the second bit-line diffusion barrier pattern 331b may be in contact with the second interlayer dielectric layer 409.

The first bit-line diffusion barrier pattern 331a may have a bottom surface at a level lower than that of a bottom surface of the second bit-line diffusion barrier pattern 331b. The first and second bit-line diffusion barrier patterns 331a and 331b may have substantially the same thickness. The first and second bit-line wire patterns 333a and 333b may have substantially the same thickness. The first bit line BL1 may have a top surface at a level lower than that of a top surface of the second bit line BL2.

As the first and second bit lines BL1 and BL2 are disposed at different heights (or levels), the storage node contact BC may have a reduced portion that overlaps along the second direction X2 with both of the first and second bit lines BL1 and BL2. Accordingly, there may be a reduction in parasitic capacitance between the first bit line BL1 and the second bit line BL2.

Figure 4B:
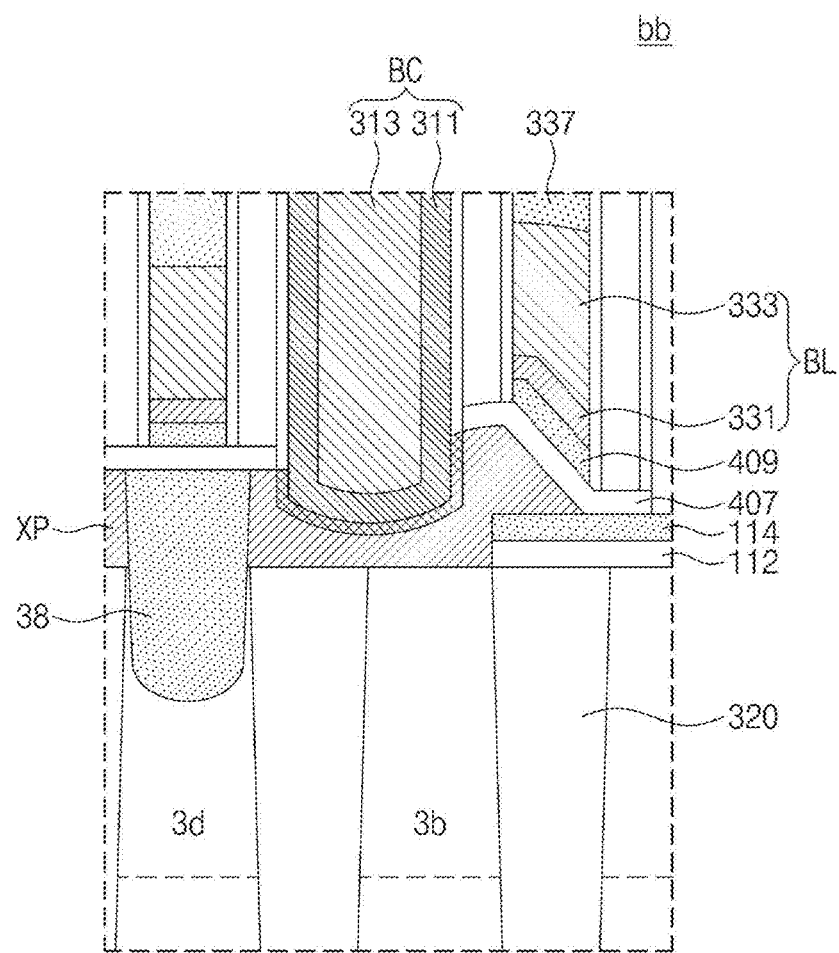
FIG. 4B illustrates an enlarged view showing section bb of FIG. 3A.
Figure 5:
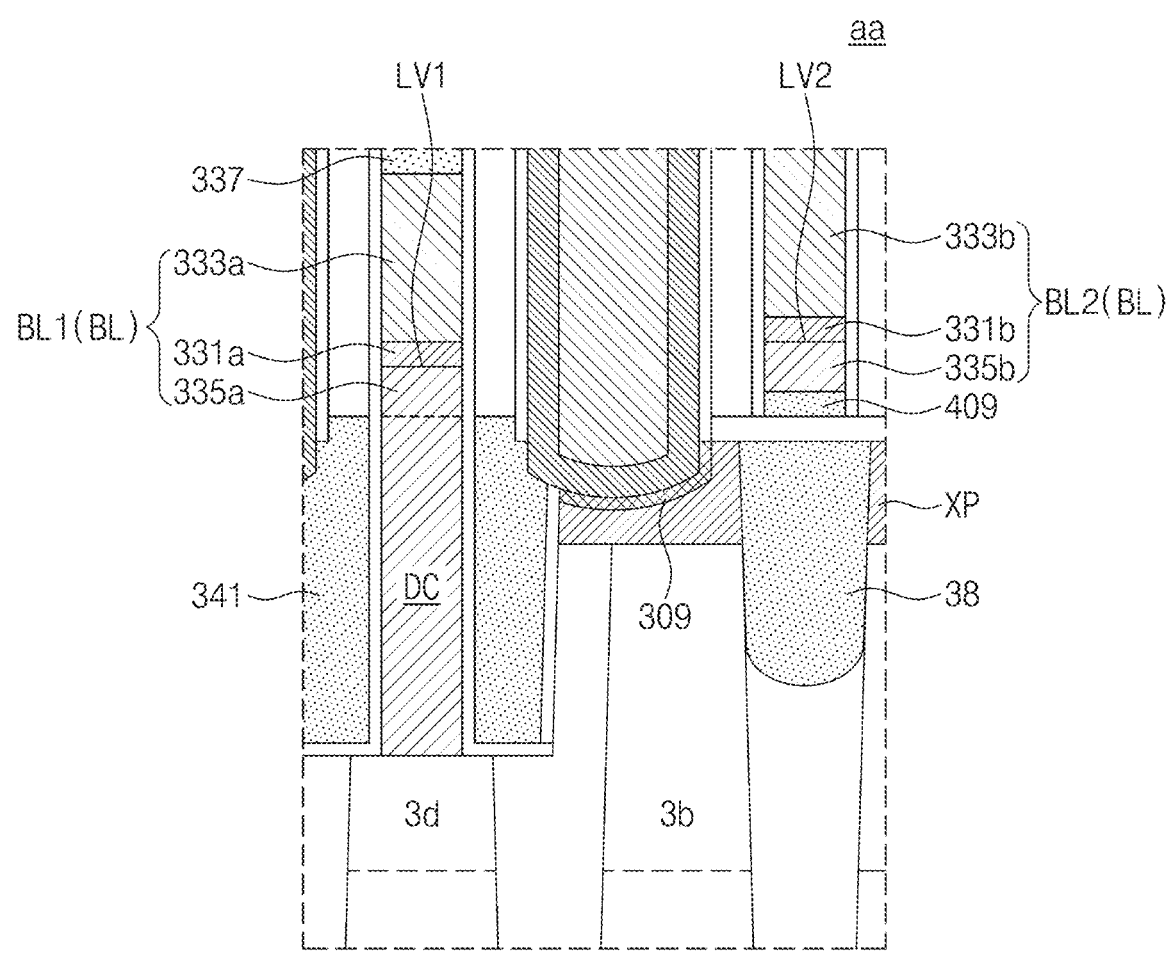
FIG. 5 illustrates an enlarged view corresponding to section aa of FIG. 3.

FIG. 4B illustrates an enlarged view showing section bb of FIG. 3A. Referring to FIGS. 3A and 4B, the storage node pad XP on the interface region IR may have an inclined top surface. The first and second diffusion barrier layers 112 and 114 may be positioned below the storage node pad XP. The storage node pad XP may have a thickness greater than that of an adjacent storage node pad XP. The bit-line diffusion barrier pattern 331 on the interface region IR may be in contact with the second interlayer dielectric layer 409. FIG. 5 illustrates an enlarged view corresponding to section aa of FIG. 3A.

Referring to FIG. 5, the first bit line BL1 may further include a first bit-line polysilicon pattern 335a, which is doped with impurities, below the first bit-line diffusion barrier pattern 331a. The second bit line BL2 may further include a second bit-line polysilicon pattern 335b, which is doped with impurities, below the second bit-line diffusion barrier pattern 331b. It may be observed that the first bit-line polysilicon pattern 335a and the bit-line contact DC are integrally formed as a single unitary piece. The second bit-line polysilicon pattern 335b may be interposed between the second diffusion barrier pattern 331b and the second interlayer dielectric layer 409. As discussed above, the bottom surface of the first bit line BL1 may be located at a lower level than that of the bottom surface of the second bit line BL2. The bottom surface of the first bit-line diffusion barrier pattern 331a may be located at a level LV1 lower than a level LV2 of the bottom surface of the second bit-line diffusion barrier pattern 331b.

FIGS. 6A to 6K and 6M to 6Q illustrate cross-sectional views showing a method of fabricating a semiconductor memory device of FIG. 3A according to some embodiments of inventive concepts. FIG. 6L illustrates an enlarged view showing section cc of FIG. 6K.

Figure 6A:
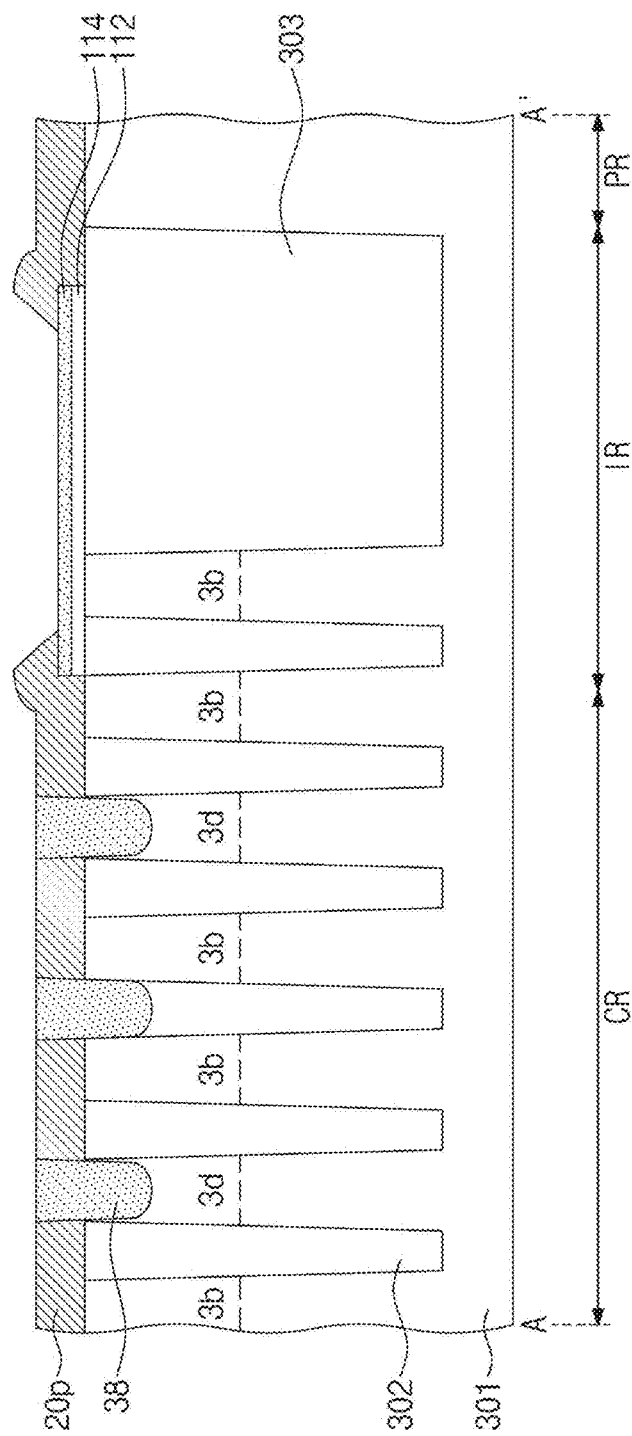

Referring to FIG. 6A, device isolation patterns 302 and a regional isolation pattern 303 may be formed in a substrate 301 including a cell array region CR, a peripheral circuit region PR, and an interface region IR. Thus, active sections ACT may be defined on the cell array region CR. For example, a device isolation trench and a regional isolation trench may be formed in the substrate 301, the device isolation trench may be filled with the device isolation patterns 302, and the regional isolation trench may be filled with the regional isolation pattern 303.

The active sections ACT and the device isolation patterns 302 may be patterned to form grooves. Word lines WL may be formed in corresponding grooves (see FIG. 3B). A pair of word lines WL may run across each of the active sections ACT. Before the word lines WL are formed, a gate dielectric layer (see 307 of FIG. 3B) may be formed on an inner surface of each of the grooves. The word lines WL may be recessed to have their top surfaces lower than those of the active sections ACT. A dielectric layer, such as a silicon nitride layer, may be formed on the substrate 301 so as to fill the grooves, and then the dielectric layer may be etched to form word-line capping patterns 310 on corresponding word lines WL. The word-line capping patterns 310 and the device isolation pattern 302 may be used as an etching mask to implant the active sections ACT with impurities to form first and second impurity regions 3d and 3b. Although not shown, at least the peripheral circuit region PR may be covered with a mask pattern (not shown) when the first and second impurity regions 3d and 3b are formed. Therefore, no impurity may be doped into the peripheral circuit region PR.

A first diffusion barrier layer 112 and a second diffusion barrier layer 114 may be sequentially formed to cover the interface region IR. Afterwards, a conductive layer may be formed on the cell array region CR and the peripheral circuit region PR of the substrate 301. The conductive layer may be, for example, an impurity-doped polysilicon layer. The conductive layer may be etched to form conductive patterns 20p and gap regions between the conductive patterns 20p. The gap regions may partially expose the device isolation pattern 302, the regional isolation pattern 303, the active sections ACT, and the gate dielectric layer 307. A pad isolation layer may be formed to fill the gap regions, and the pad isolation layer may be etched back to form a pad isolation pattern 38 in the gap regions. The pad isolation pattern 38 may have a grid shape when viewed in plan.

Figure 6B:
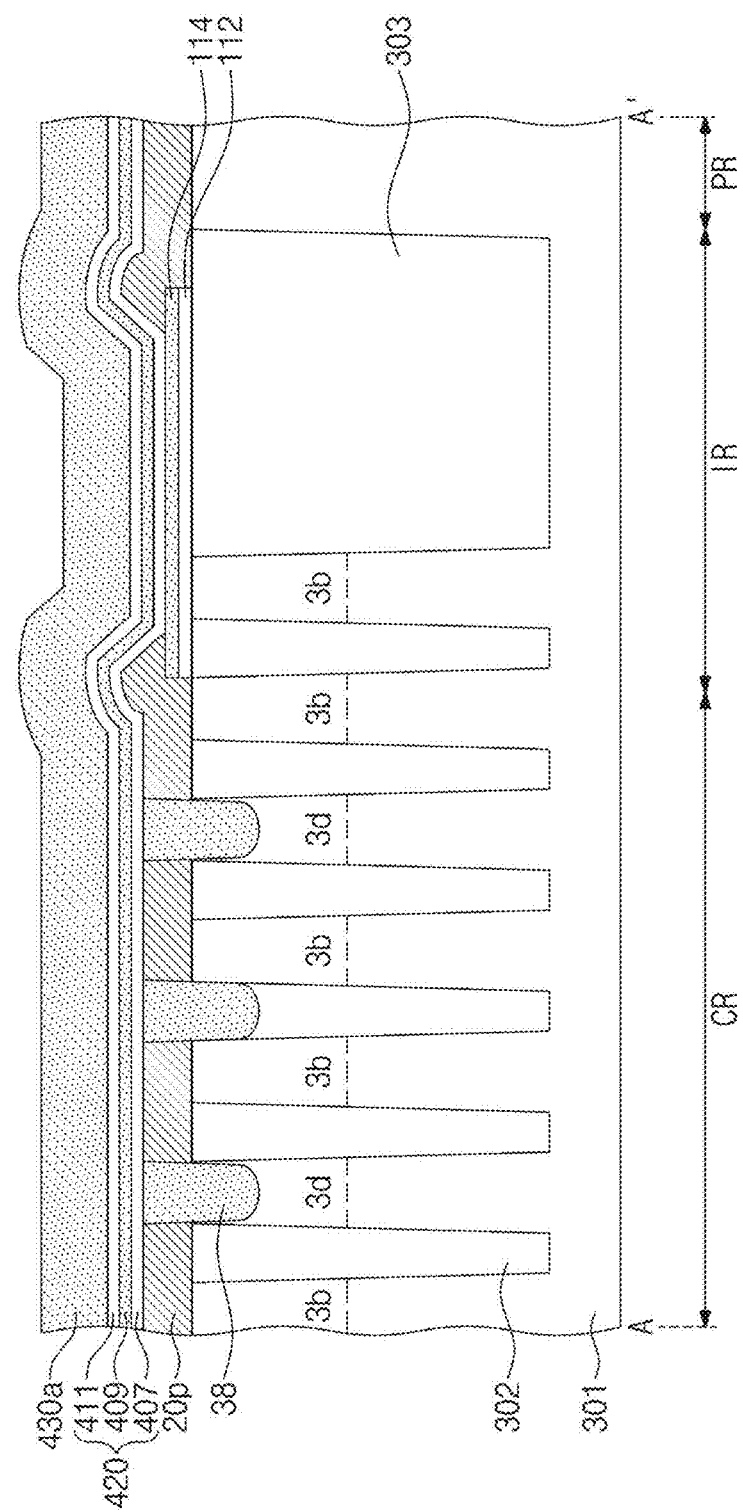

Referring to FIG. 6B, an interlayer dielectric layer 420 may be formed on the conductive patterns 20*p* and the pad isolation pattern 38. The interlayer dielectric layer 420 may include first to third interlayer dielectric layers 407, 409, and 411 that are sequentially stacked. For example, the first interlayer dielectric layer 407 may include silicon oxide, the second interlayer dielectric layer 409 may include silicon nitride, and the third interlayer dielectric layer 411 may include silicon oxide. After that, a thick silicon nitride layer 430*a* may be formed on the third interlayer dielectric layer 411. The silicon nitride layer 430*a* may have a thickness greater than that of the interlayer dielectric layer 420.

Figure 6C:
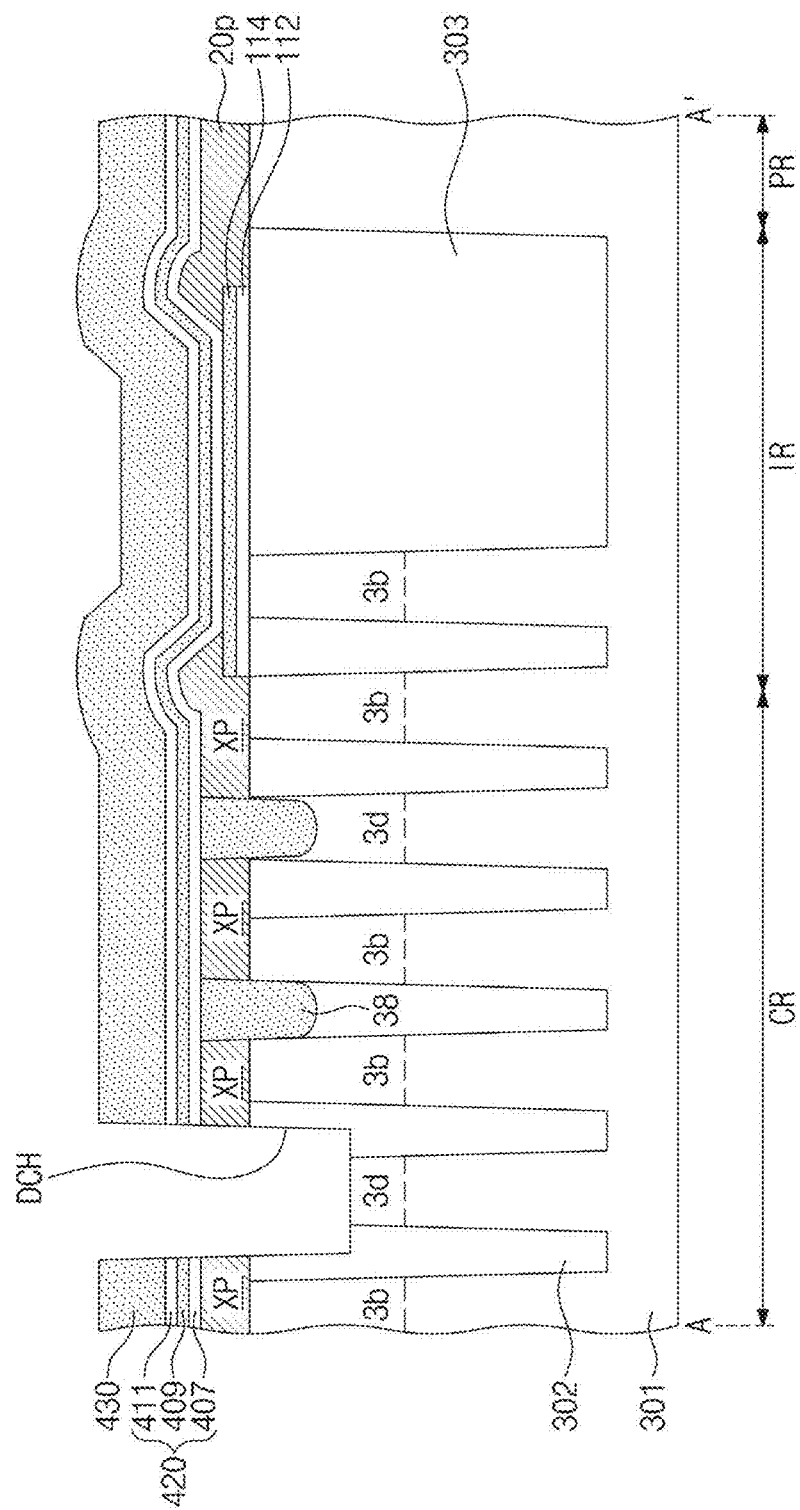

Referring to FIG. 6C, an opening may be formed in the silicon nitride layer 430*a* to form a silicon nitride mask pattern 430. The silicon nitride mask pattern 430 may be used as an etching mask to etch the pad isolation pattern 38 and the interlayer dielectric layer 420 on the first impurity region 3*d* to form contact holes DCH that expose the first impurity regions 3*d*. In this step, the conductive patterns 20*p* adjacent to the pad isolation pattern 38 may also be partially etched to form storage node pads XP.

Figure 6D:
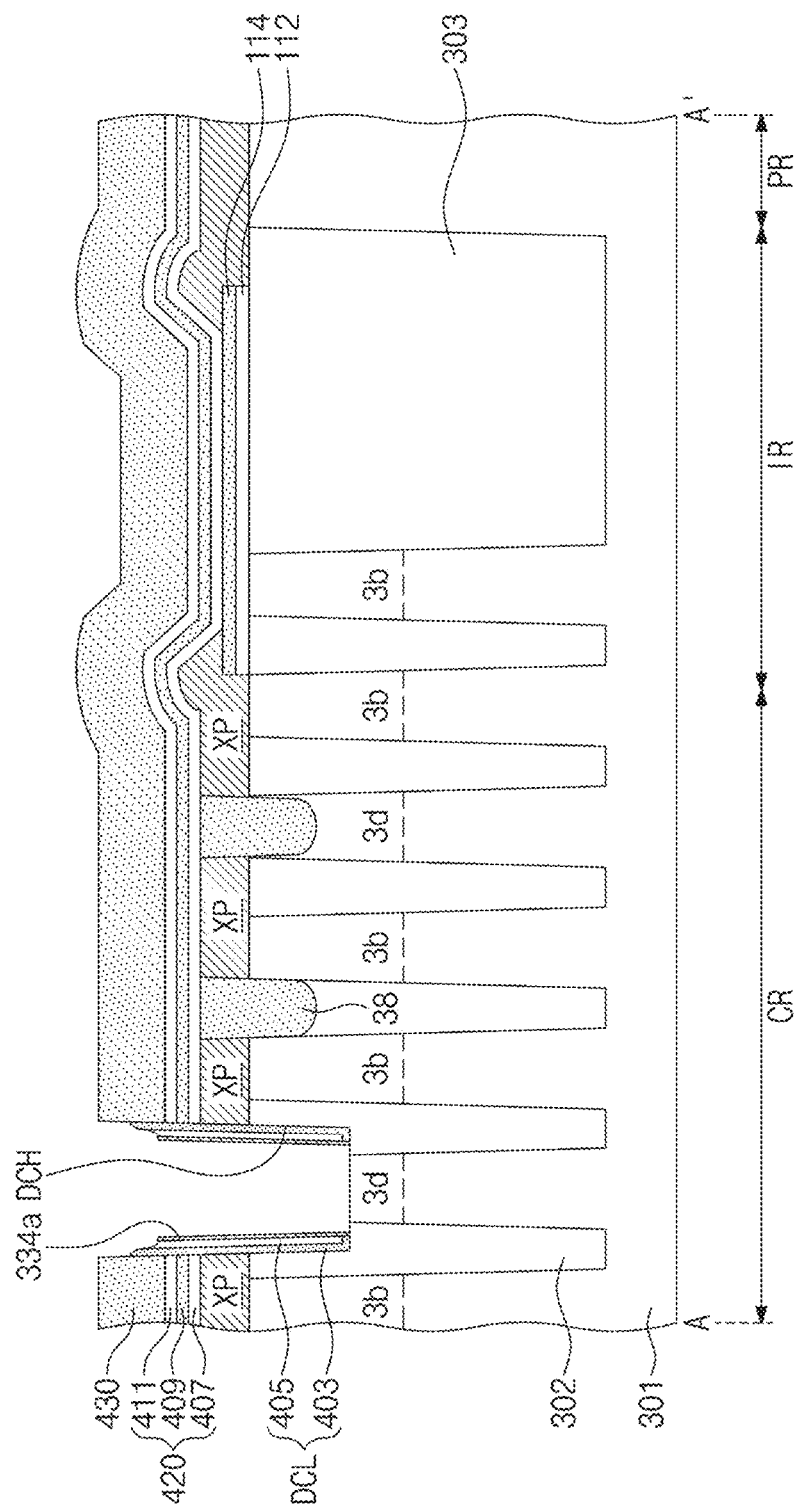

Referring to FIG. 6D, a first contact dielectric layer and a sacrificial layer may be conformally and sequentially formed on an entire surface of the substrate 301, and may then undergo an anisotropic etching process to form a first contact dielectric pattern 403 and a sacrificial pattern 405 that sequentially cover inner walls of the contact holes DCH. The first contact dielectric pattern 403 and the sacrificial pattern 405 may be formed of materials having an etch selectivity with respect to each other. For example, the first contact dielectric pattern 403 may include silicon nitride, and the sacrificial pattern 405 may include silicon oxide. Thereafter, a polysilicon spacer 334*a* may be formed on the sacrificial pattern 405. For example, a polysilicon liner may be formed, and then an etching process may be performed to form the polysilicon spacer 334*a*.

Figure 6E:
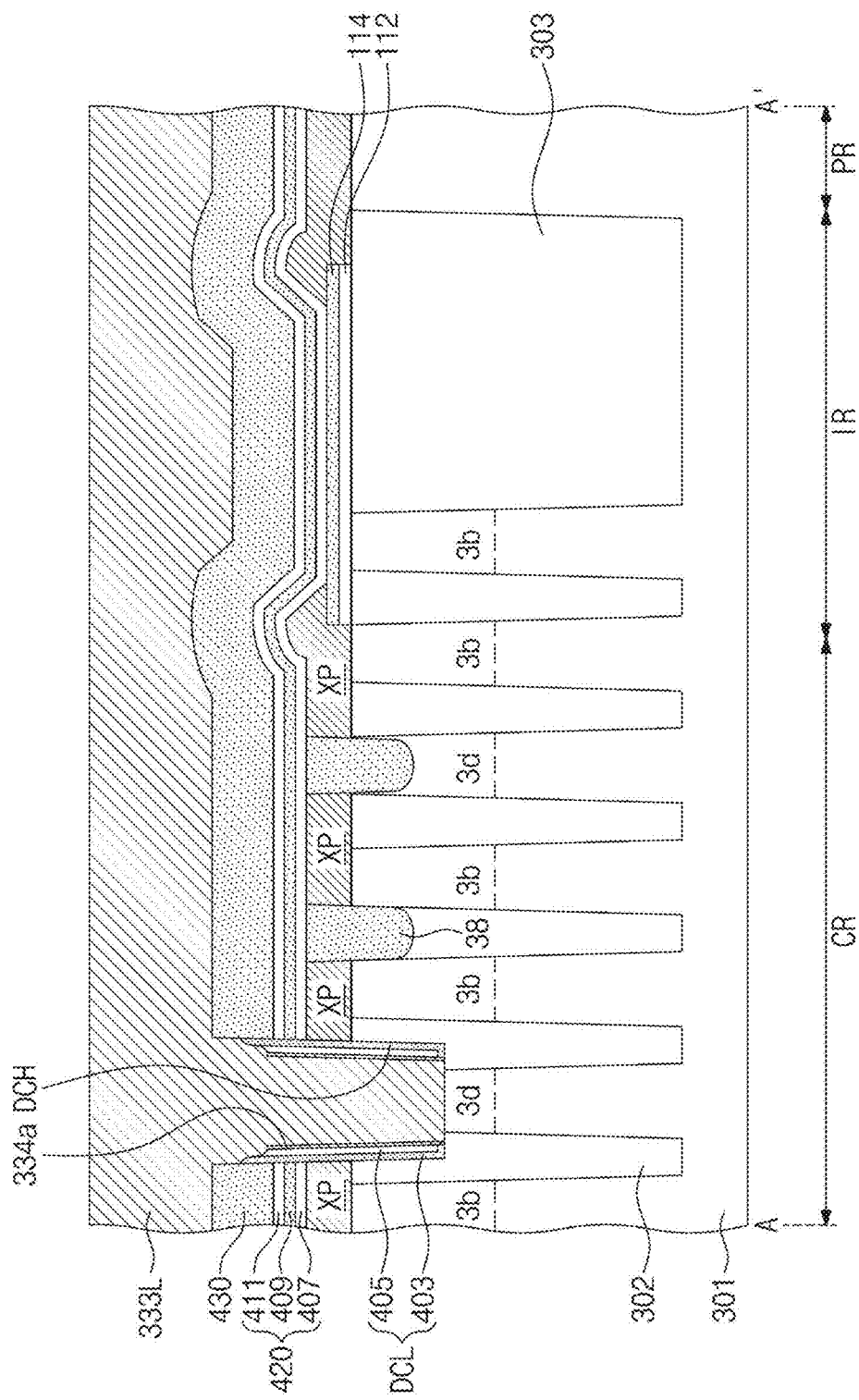

Referring to FIG. 6E, a polysilicon layer 333L may be formed on the entire surface of the substrate 301. The polysilicon layer 333L may be doped with impurities. The polysilicon layer 333L may fill the contact holes DCH.

Figure 6F:
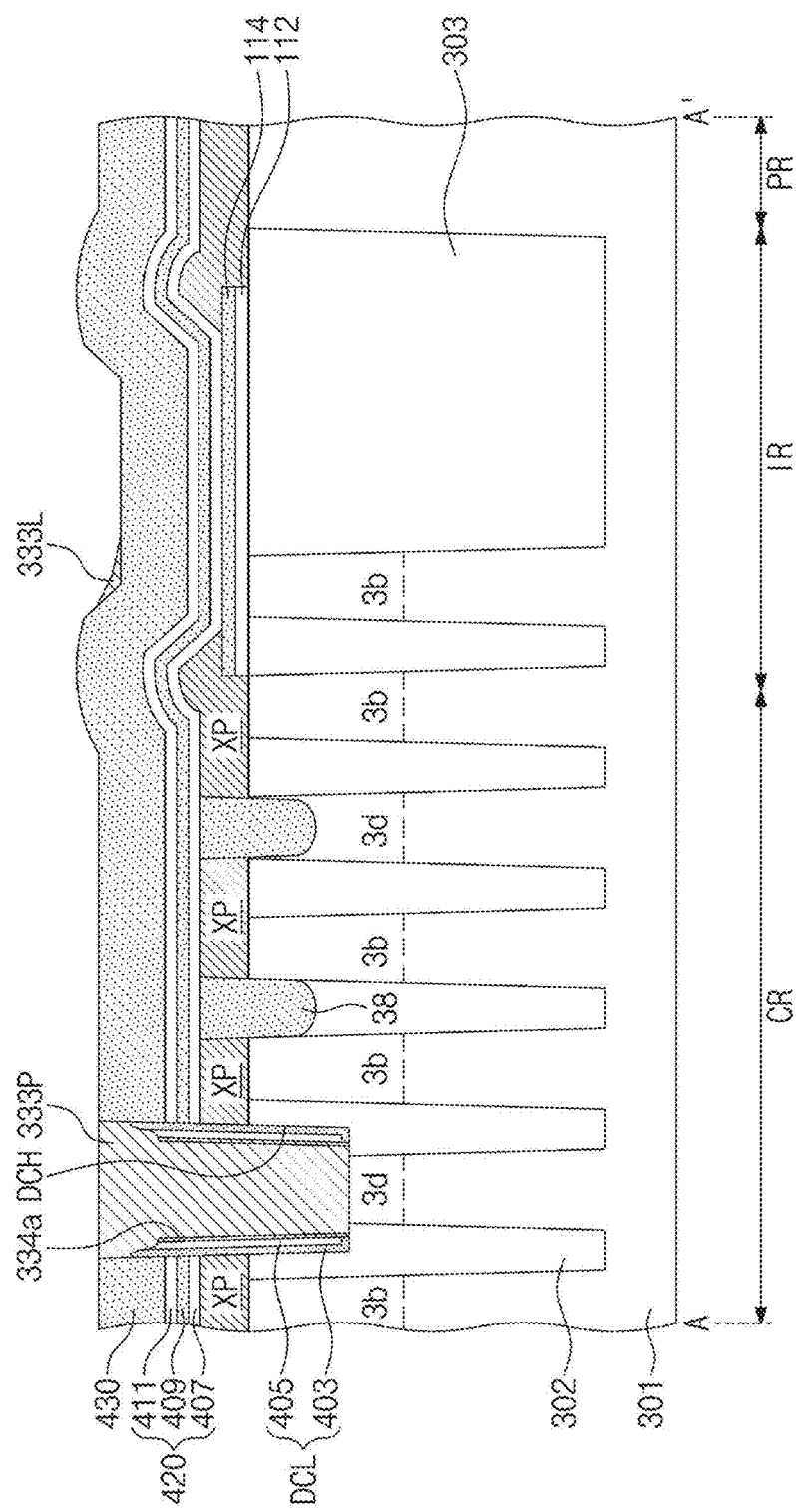

Referring to FIG. 6F, an etch-back process may be employed to remove at least a portion of the polysilicon layer 333L. The etching process may be performed until the silicon nitride mask pattern 430 on the peripheral circuit region PR is exposed in a first place and the silicon nitride mask pattern 430 on the cell array region CR is exposed in a second place. An end point detection (EPD) process may be utilized to ascertain whether the silicon nitride mask pattern 430 is exposed or not. Even when the silicon nitride mask pattern 430 on the cell array region CR is exposed, some of the polysilicon layer 333L may remain on the interface region IR. The etching process may be performed such that the polysilicon layer 333L may be formed into a polysilicon pattern 333P that fills the contact hole DCH and does not extend onto the silicon nitride mask pattern 430. The etching process may be a selective etching process that selectively etches a polysilicon material.

Figure 6G:
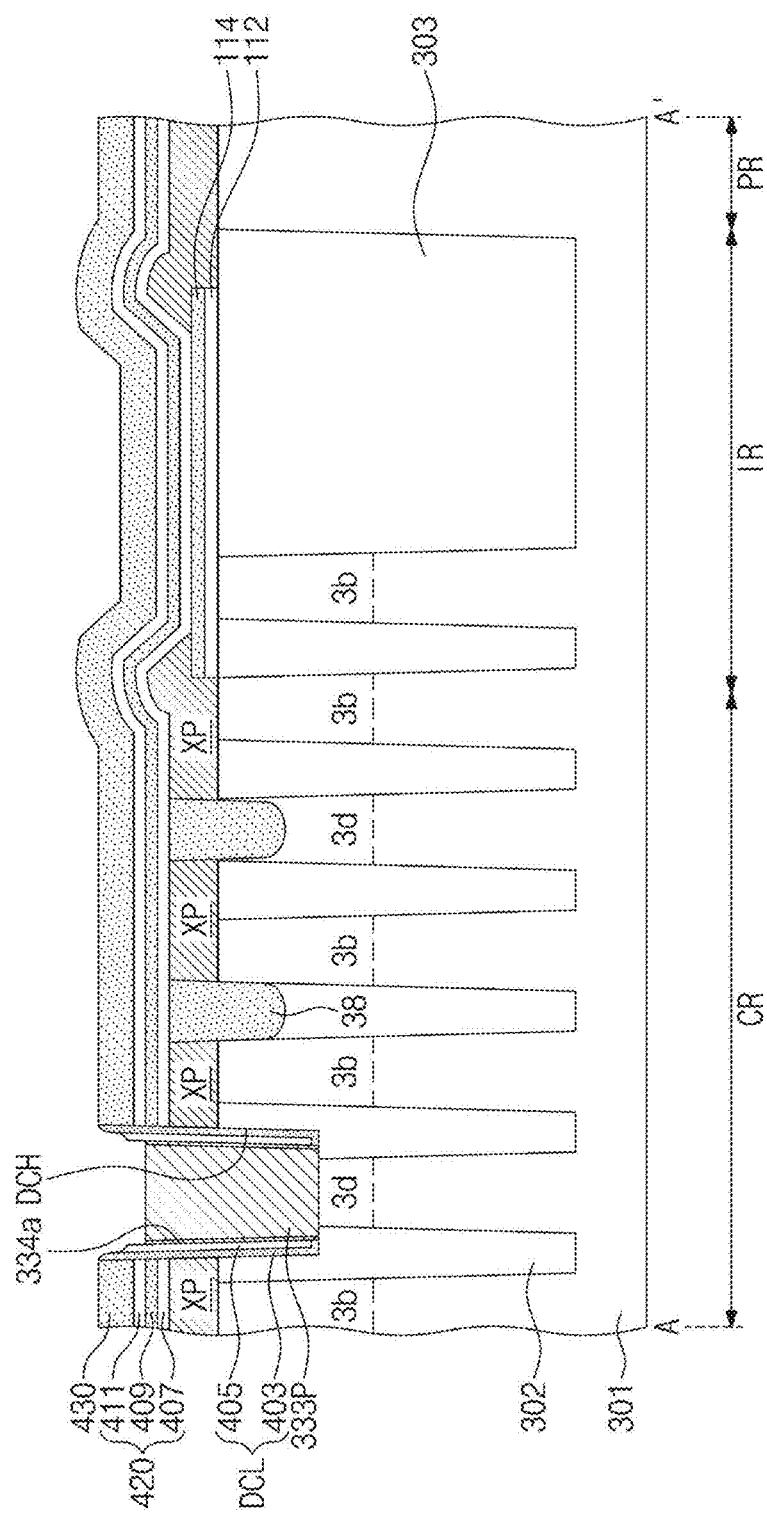

Referring to FIG. 6G, an additional etching process may be performed on the polysilicon pattern 333P. In this additional etching process, the polysilicon layer 333L may be completely removed on the interface region IR. The etching process may be a selective etching process that selectively etches a polysilicon material. According to some embodiments, in this etching process, the silicon nitride mask pattern 430 may also be partially etched to have a thickness that is reduced to some extent. The polysilicon pattern 333P may have a top surface whose level is controlled due to adjustment of etching time duration. The top surface of the polysilicon pattern 333P may be located at a level lower than that of a top surface of the silicon nitride mask pattern 430.

Figure 6H:
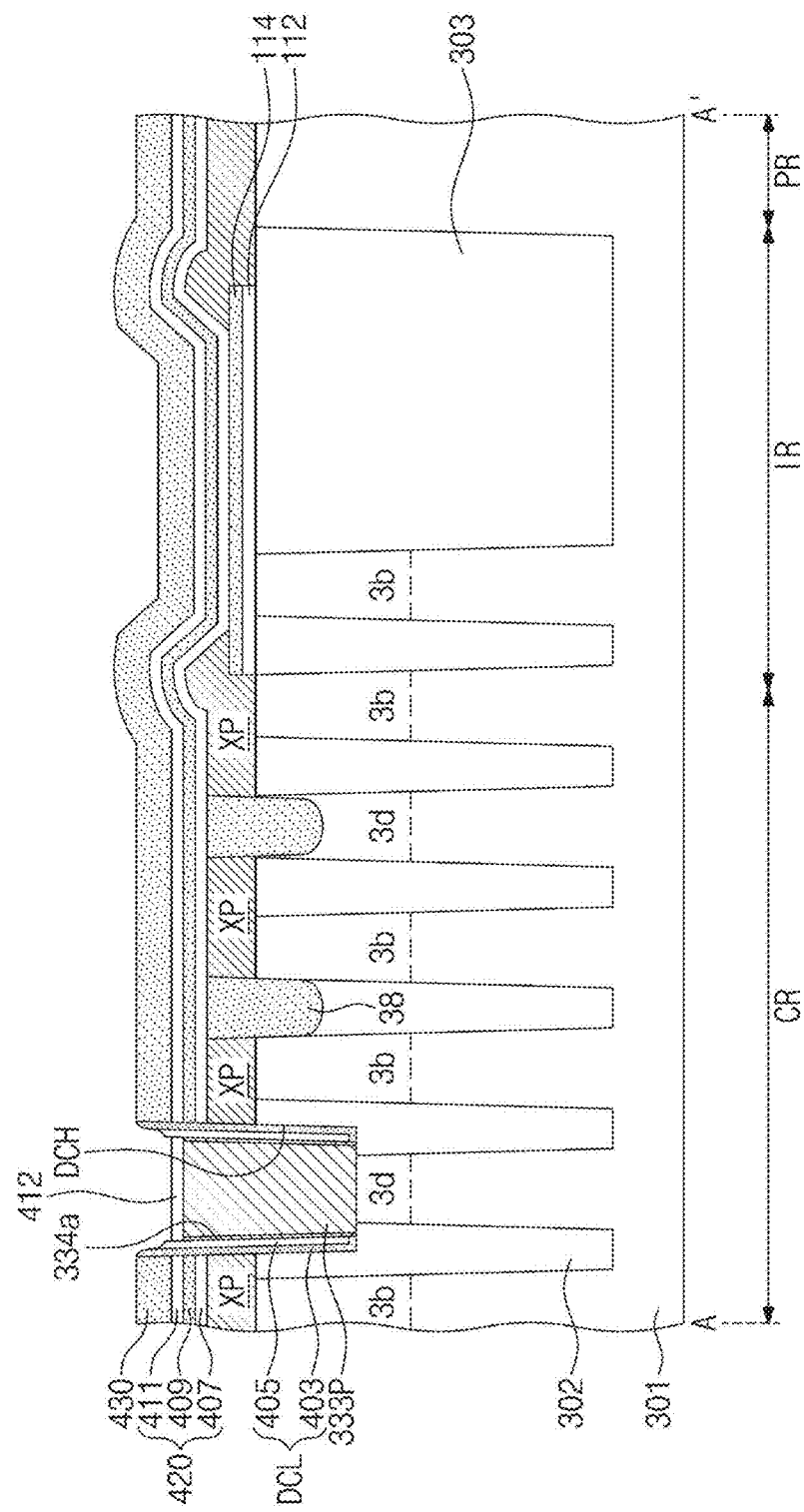

Referring to FIG. 6H, the polysilicon pattern 333P may be oxidized to form an oxide layer 412.

Figure 6I:
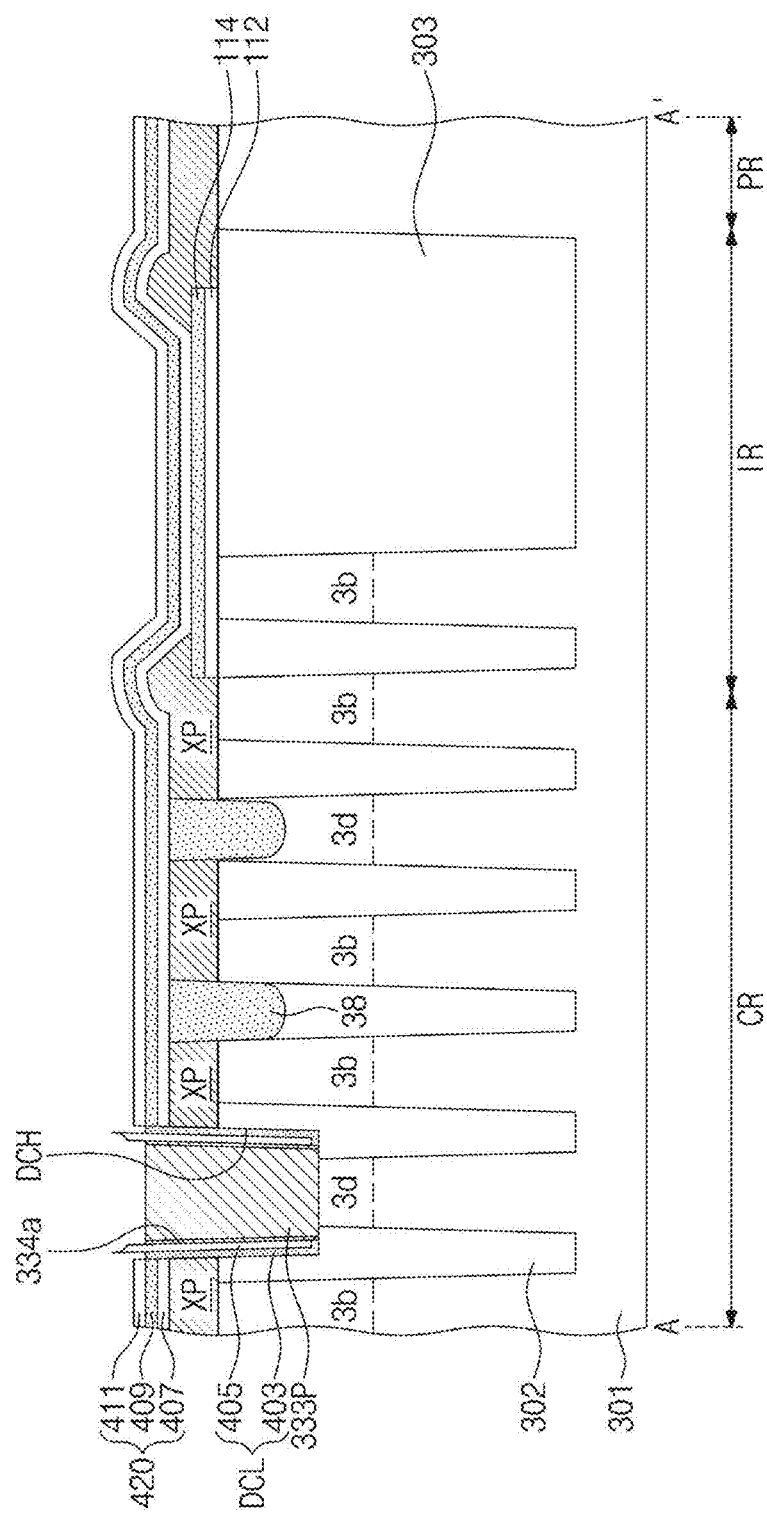

Referring to FIG. 6I, a selective etching process may be performed on the silicon nitride mask pattern 430. A phosphoric acid ($H_3PO_4$) may be used to execute the selective etching process. An upper portion of the first contact dielectric pattern 403 may be partially removed in this procedure. According to some embodiments, the first contact dielectric pattern 403 may have a top surface coplanar with that of the polysilicon pattern 333P.

Figure 6J:
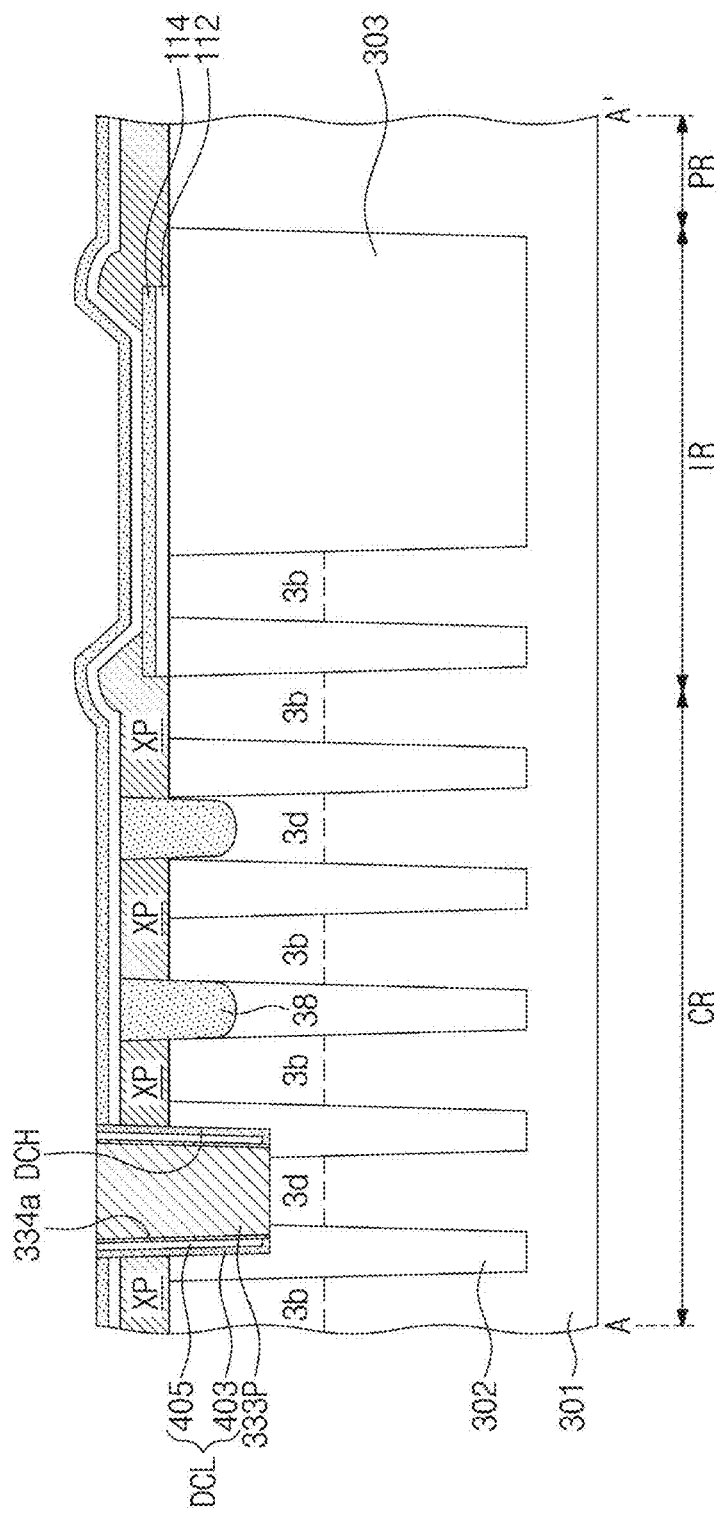

Referring to FIG. 6J, a cleaning solution or a wet etching may be used to remove the third interlayer dielectric layer 411 and a protruding portion of the sacrificial pattern 405.

Figure 6K:
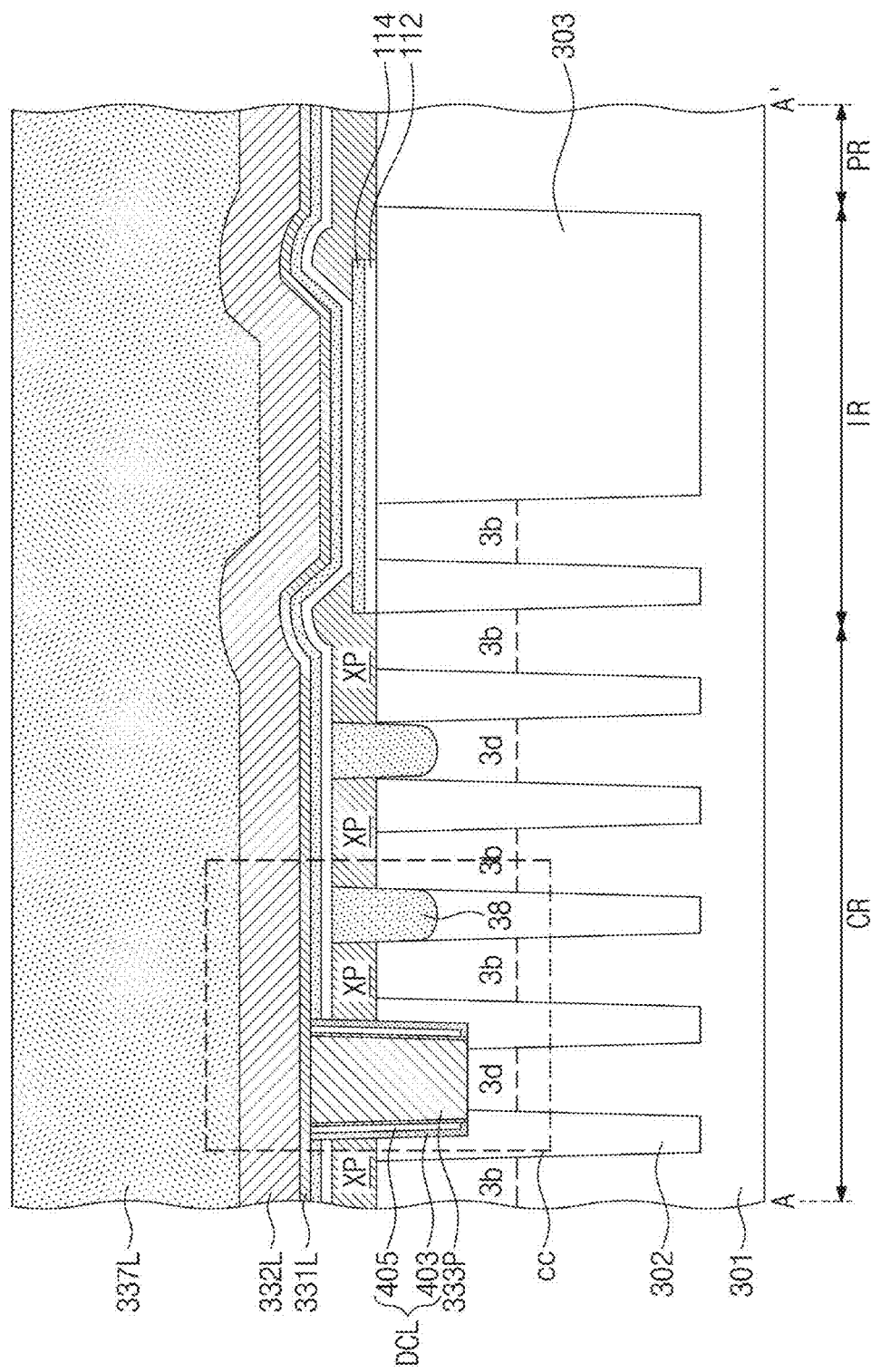
Figure 6L:
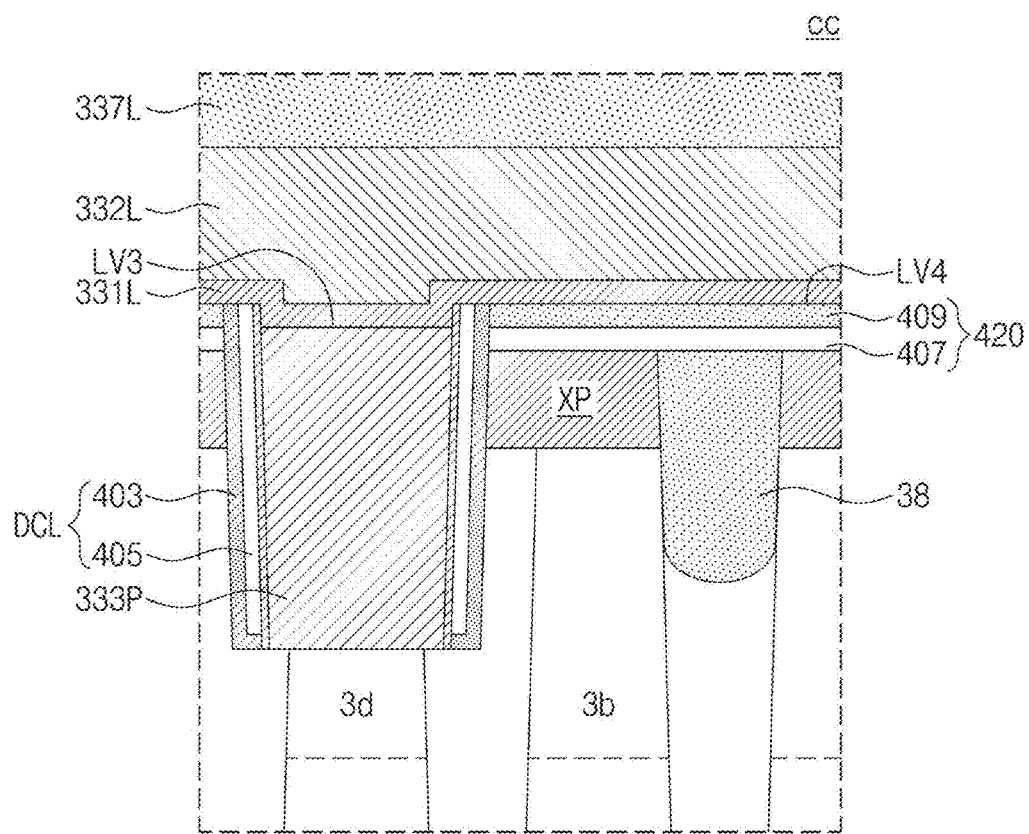
FIG. 6L illustrates an enlarged view showing section cc of FIG. 6K.

Referring to FIG. 6K, a bit-line diffusion barrier layer 331L, a bit-line wire layer 332L, and a bit-line capping layer 337L may be sequentially formed. Referring together to FIG. 6L, a selective etching process such as that discussed above with reference to FIG. 6G may be performed to allow the top surface of the polysilicon pattern 333P to have a level lower than that of a top surface of the interlayer dielectric layer 420. Accordingly, a level LV3 of a bottom surface of the bit-line diffusion barrier layer 331L that vertically overlaps the polysilicon pattern 333P may be lower than a level LV4 of a bottom surface of the bit-line diffusion barrier layer 331L that vertically overlaps the interlayer dielectric layer 420.

Figure 6M:
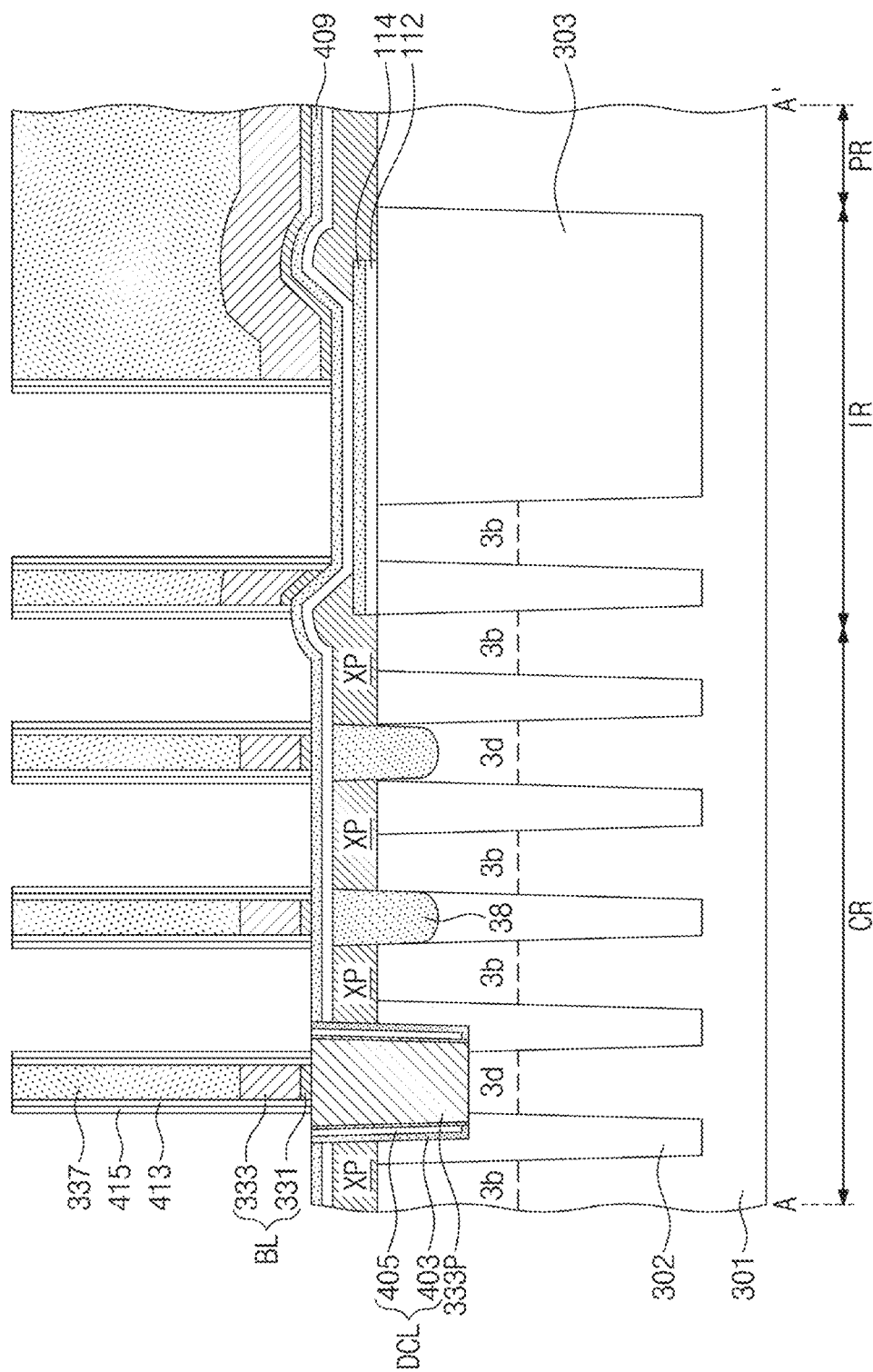

Referring to FIG. 6M, the bit-line capping layer 337L, the bit-line wire layer 332L, and the bit-line diffusion barrier layer 331L may be sequentially etched to expose a top surface of the second interlayer dielectric layer 409 and simultaneously to form a bit-line capping pattern 337 and a bit line BL. The bit line BL may be provided thereunder with the polysilicon pattern 333P that fills the contact hole DCH. In this description, the polysilicon pattern 333P may be called a preliminary bit-line contact 333P. A first protective spacer 413 and a second protective spacer 415 may be formed to sequentially cover a sidewall of the bit-line capping pattern 337 and a sidewall of the bit line BL. The first and second protective spacers 413 and 415 may include materials having an etch selectivity with respect to each other. The second protective spacer 415 may include the same material as that of the sacrificial pattern 405. The first protective spacer 413 may include a material having an etch selectivity with respect also to the bit-line capping pattern 337 and the second interlayer dielectric layer 409. The first protective spacer 413 may include, for example, SiOC.

Figure 6N:
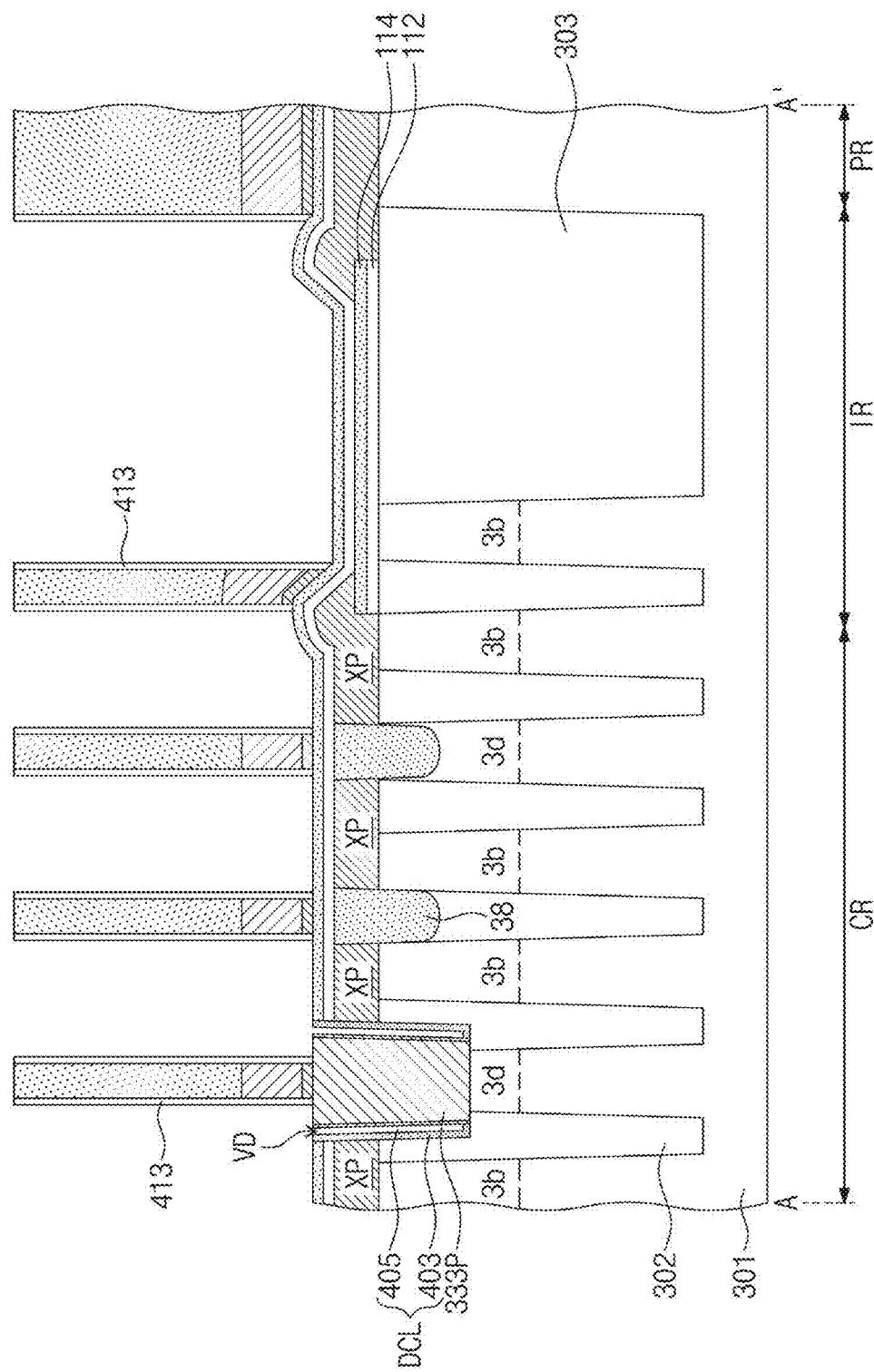
Figure 60:
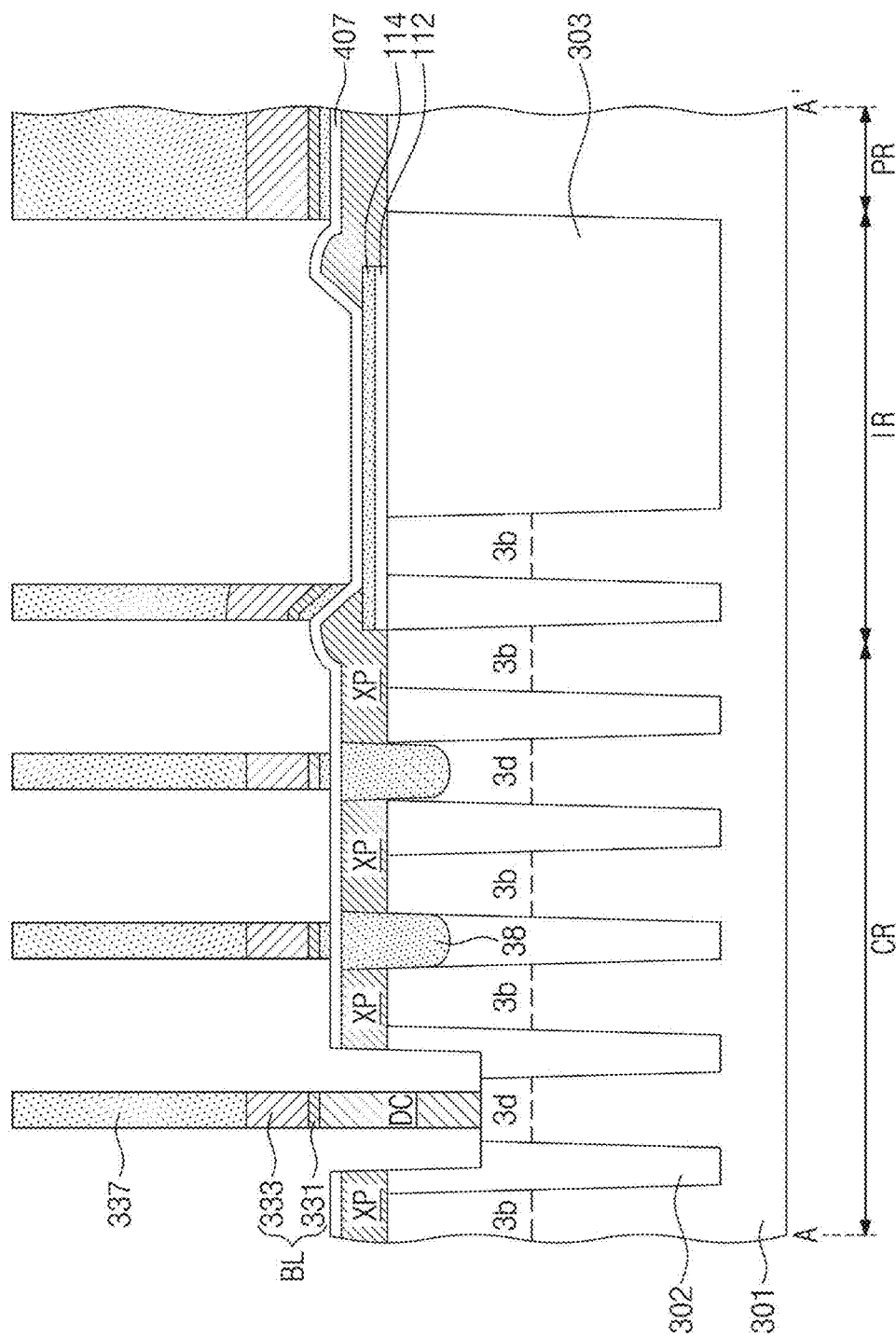

Referring to FIG. 6N, the sacrificial pattern 405 may be removed to form a void region VD between the preliminary bit-line contact 333P and the first contact dielectric pattern 403. In this step, the second protective spacer 415 may also be removed which is formed of the same material as that of the sacrificial pattern 405. Therefore, a sidewall of the first protective spacer 413 may be exposed. The first protective spacer 413 may protect the bit-line capping pattern 337 and the bit line BL.

Referring to FIGS. 6N and 6O, the first protective spacer 413 may be removed. The bit-line capping pattern 337 may be used as an etching mask to etch the preliminary bit-line contact 333P to form a bit-line contact DC. An etchant that etches the preliminary bit-line contact 333P may be easily introduced through the void region VD into the contact hole DCH, and thus the bit-line contact DC may be formed to have a width that is uniform regardless of height. The first contact dielectric pattern 403 may protect the storage node pad XP from being etched. The etching process may remove the first contact dielectric pattern 403 that covers a lateral surface of the storage node pad XP. In the etching process, the second interlayer dielectric layer 409 may be etched to expose a top surface of the first interlayer dielectric layer 407.

Figure 6P:
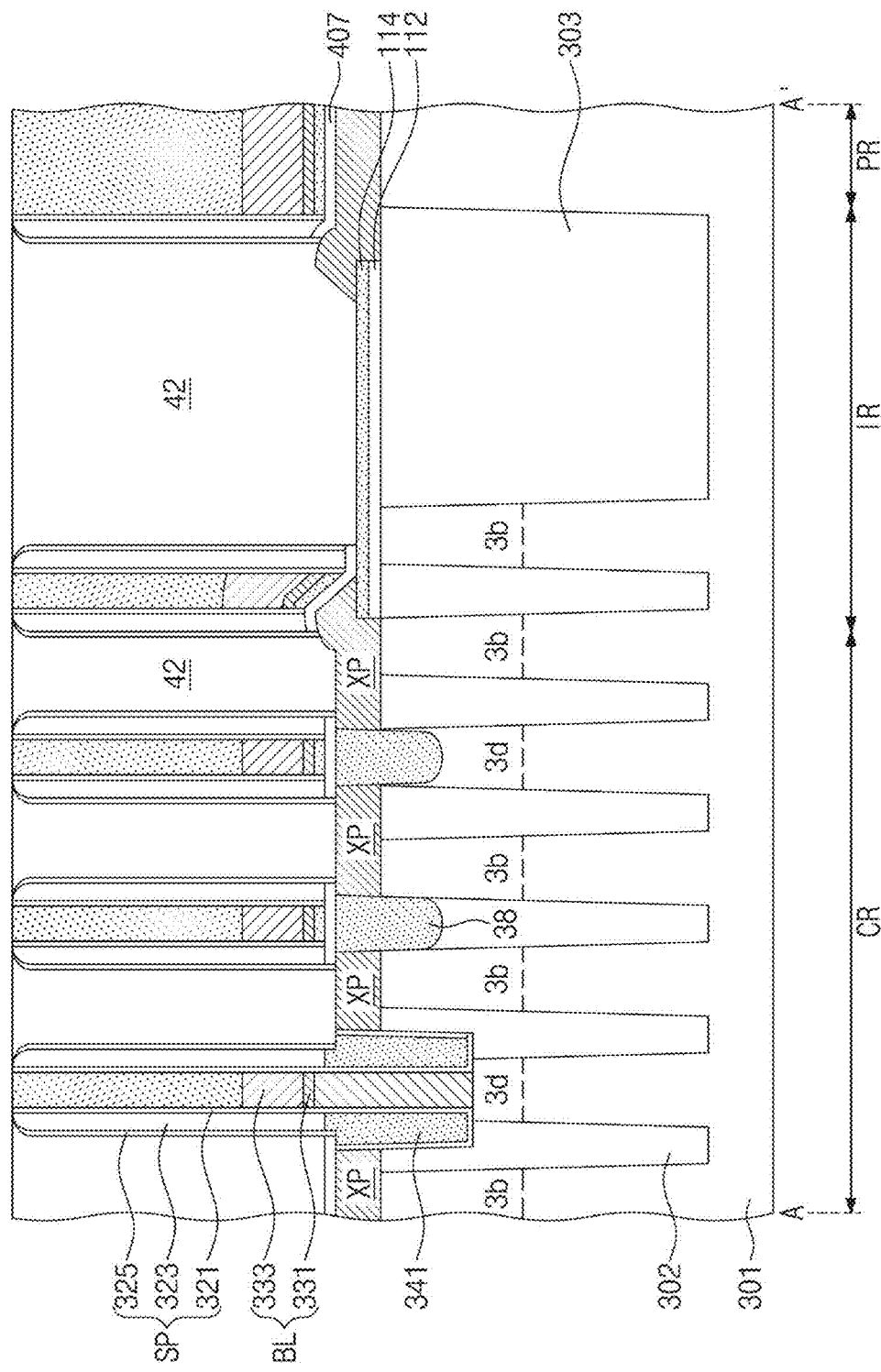

Referring to FIG. 6P, a spacer liner 321 may be conformally formed on the entire surface of the substrate 301. A buried dielectric layer (not shown) may be formed on the spacer liner 321 to fill the contact hole DCH. The buried dielectric layer may undergo an etch-back process to form a buried dielectric pattern 341 in the contact hole DCH. A first spacer layer may be conformally formed on the entire surface of the substrate 301, and the first spacer layer may be etched back to form a first spacer 323 that covers a sidewall of the spacer liner 321. In this step, the first interlayer dielectric layer 407 may also be etched to expose top surfaces of the storage node pads XP. In addition, the buried dielectric pattern 341 and the spacer liner 321 may also be partially exposed. A second spacer layer may be conformally formed on the entire surface of the substrate 301, and the second spacer layer may be etched back to form a second spacer 325 that covers a sidewall of the first spacer 323. Therefore, a bit-line spacer SP may be formed. A sacrificial buried layer may be formed to fill a space between the bit lines BL on the entire surface of the substrate 301, and thus sacrificial buried patterns 42 may be formed between the bit lines BL and between the bit line BL and a gate pattern GLP. The sacrificial buried patterns 42 may be formed of, for example, silicon oxide, tetraethylorthosilicate (TEOS), or tonensilazene (TOSZ). The sacrificial buried patterns 42 on the cell array region CR may overlap the storage node pads XP. A node isolation layer may be formed on the entire surface of the substrate 301 to fill node isolation holes, and the node isolation layer may be etched back to form node isolation patterns. The node isolation patterns may include, for example, silicon oxide.

Figure 6Q:
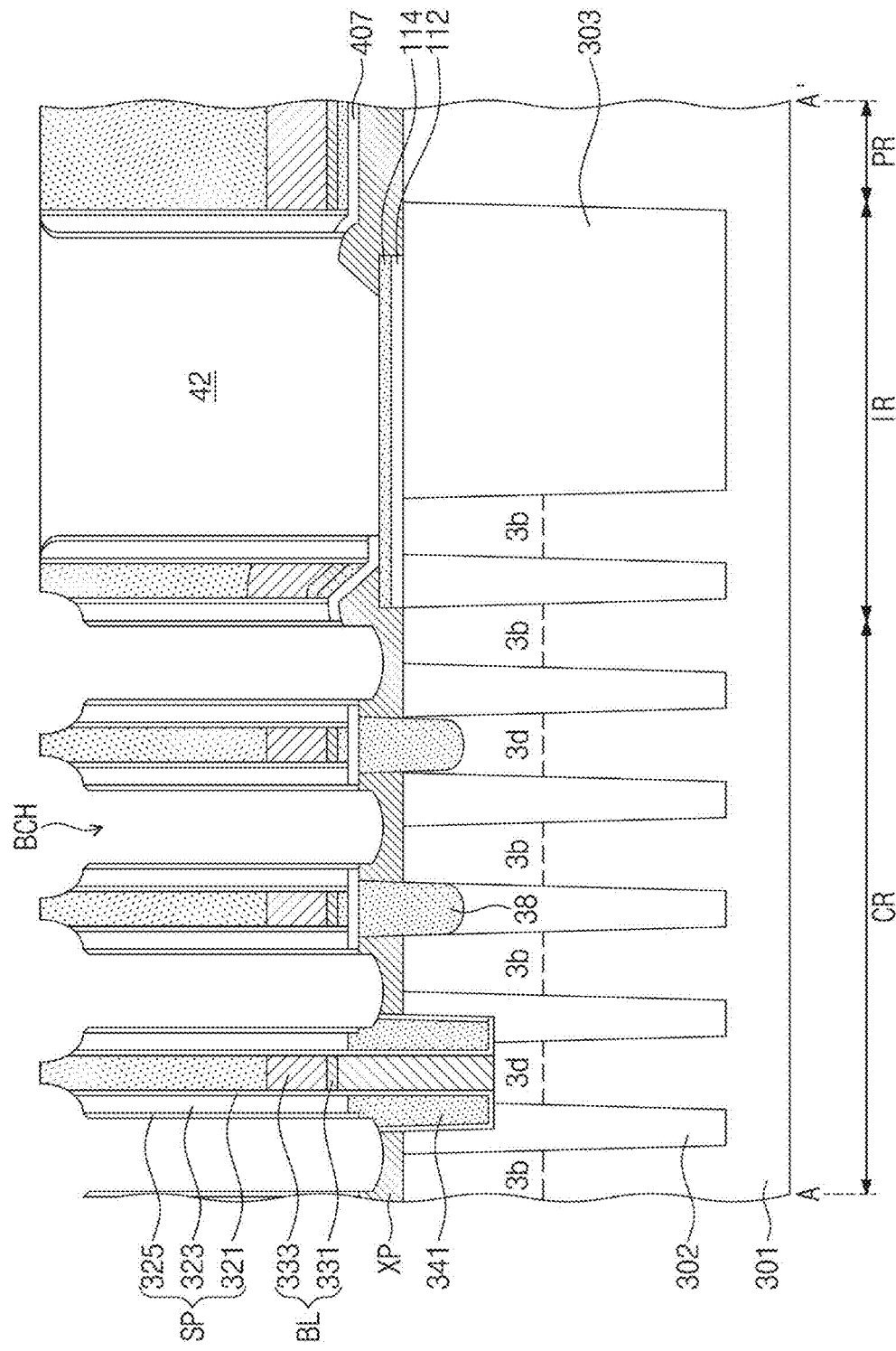

Referring to FIG. 6Q, the sacrificial buried patterns 42 interposed between the bit lines BL may be removed to expose the buried dielectric pattern 341 and the storage node pads XP. An etching process may be performed to partially etch the buried dielectric pattern 341 and the storage node pad XP that are exposed between the bit lines BL, thereby forming a storage nod contact hole BCH that exposes the storage node pad XP.

Referring back to FIG. 3A, a contact diffusion barrier layer (not shown) may be conformally formed on the entire surface of the substrate 301, and a contact metal layer (not shown) may be formed on the contact diffusion barrier layer to fill the storage node contact hole BCH. The contact diffusion barrier layer and the contact metal layer may all include metal, and may be formed by a process (e.g., deposition process) performed at a lower temperature (e.g., hundreds of degrees Celsius or from about 300° C. to about 400° C.) than that (e.g., about 1000° C.) of an annealing process.

A chemical mechanical polishing (CMP) process may be subsequently performed to expose a top surface of the bit-line capping pattern 337 and simultaneously to form a contact diffusion barrier pattern 311 and a contact metal pattern 313. A portion of the contact diffusion barrier layer may be formed into the contact diffusion barrier pattern 311. A portion of the contact metal layer may be formed into the contact metal pattern 313. The contact diffusion barrier pattern 311 and the contact metal pattern 313 may constitute a storage node contact BC. Subsequently, a conductive layer may be formed on the storage node contact BC and the bit-line capping patterns 337, and then the conductive layer may be etched to form landing pads LP and to form trenches between the landing pads LP. The trenches may be filled with a dielectric layer, and then an etch-back process or a chemical mechanical polishing (CMP) process may be performed to form landing pad isolation patterns LPS. Data storage patterns DSP may be formed on the landing pads LP.

Figure 7:
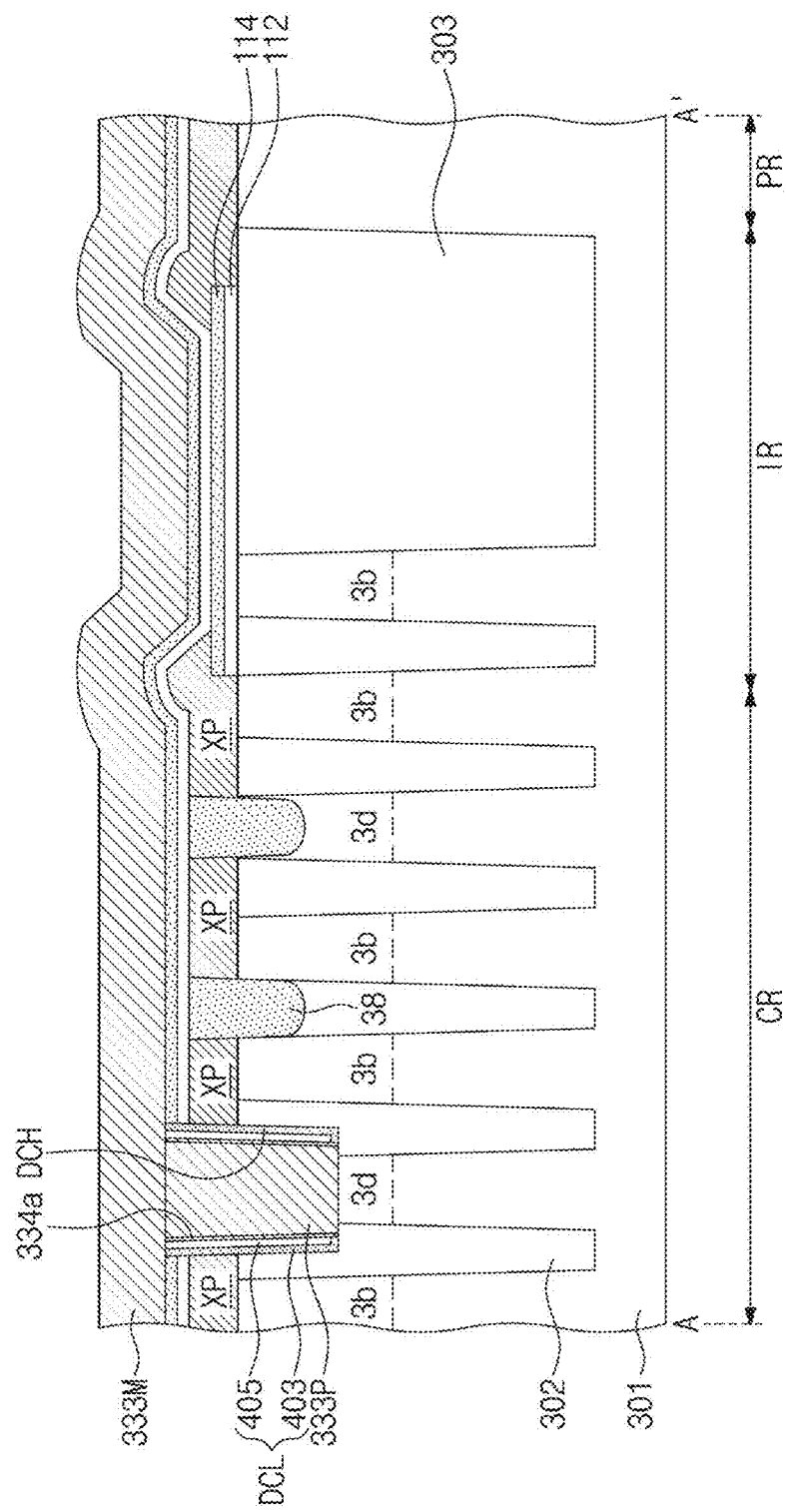
FIG. 7 illustrates a cross-sectional view showing a method of fabricating a semiconductor memory device according to some embodiments of inventive concepts.

FIG. 7 illustrates a cross-sectional view showing a method of fabricating a semiconductor memory device according to some embodiments of inventive concepts.

Referring to FIGS. 6J and 7, before the bit-line diffusion barrier layer 331L is formed, impurity-doped additional polysilicon layer 333M may be formed on the entire surface of the substrate 301. Afterwards, processes may be performed identically to those of FIGS. 6K, 6M to 6Q, and 3A. The impurity-doped additional polysilicon layer 333M may be disposed below the bit-line diffusion barrier pattern 331 to thereby constitute the bit line BL, thereby having a structure as shown in FIG. 5.

Figure 8A:
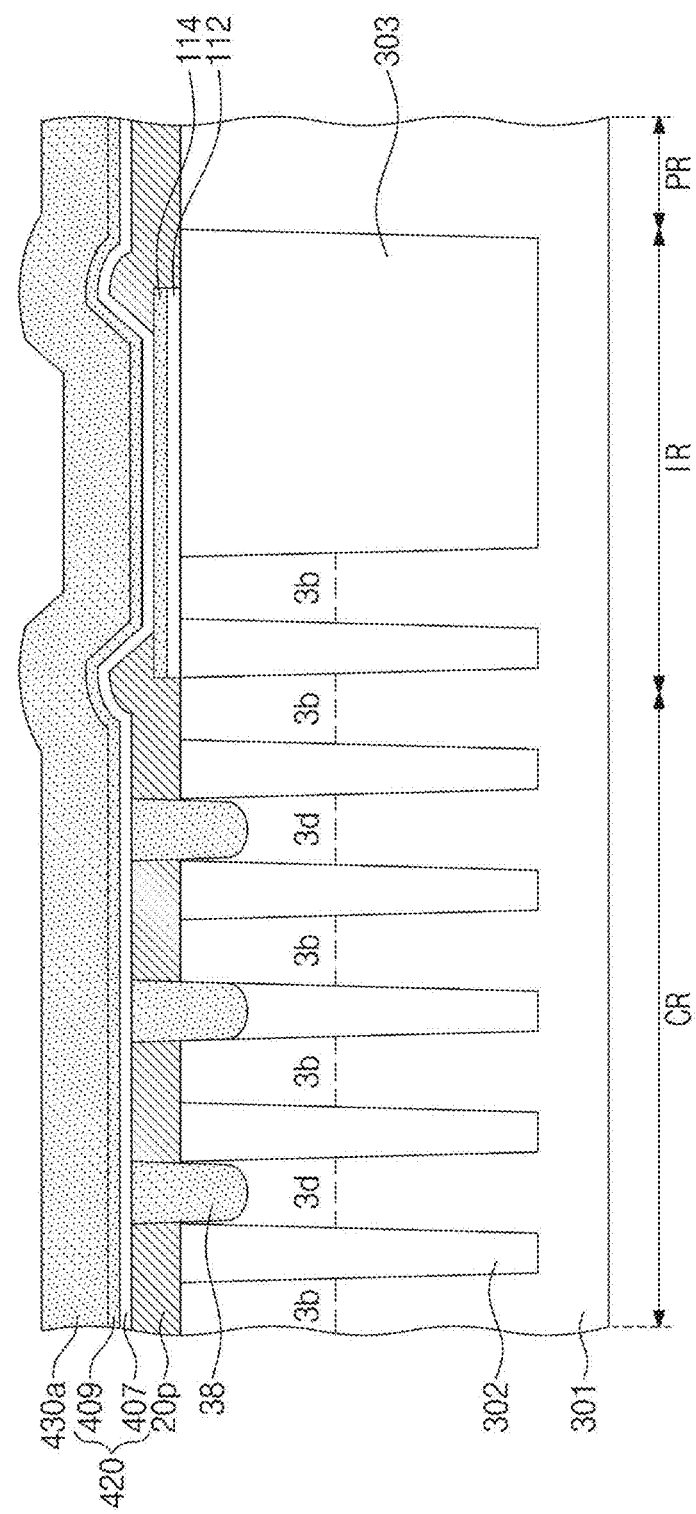
FIGS. 8A to 8C illustrate cross-sectional views showing a method of fabricating a semiconductor memory device according to some embodiments of inventive concepts.
Figure 8B:
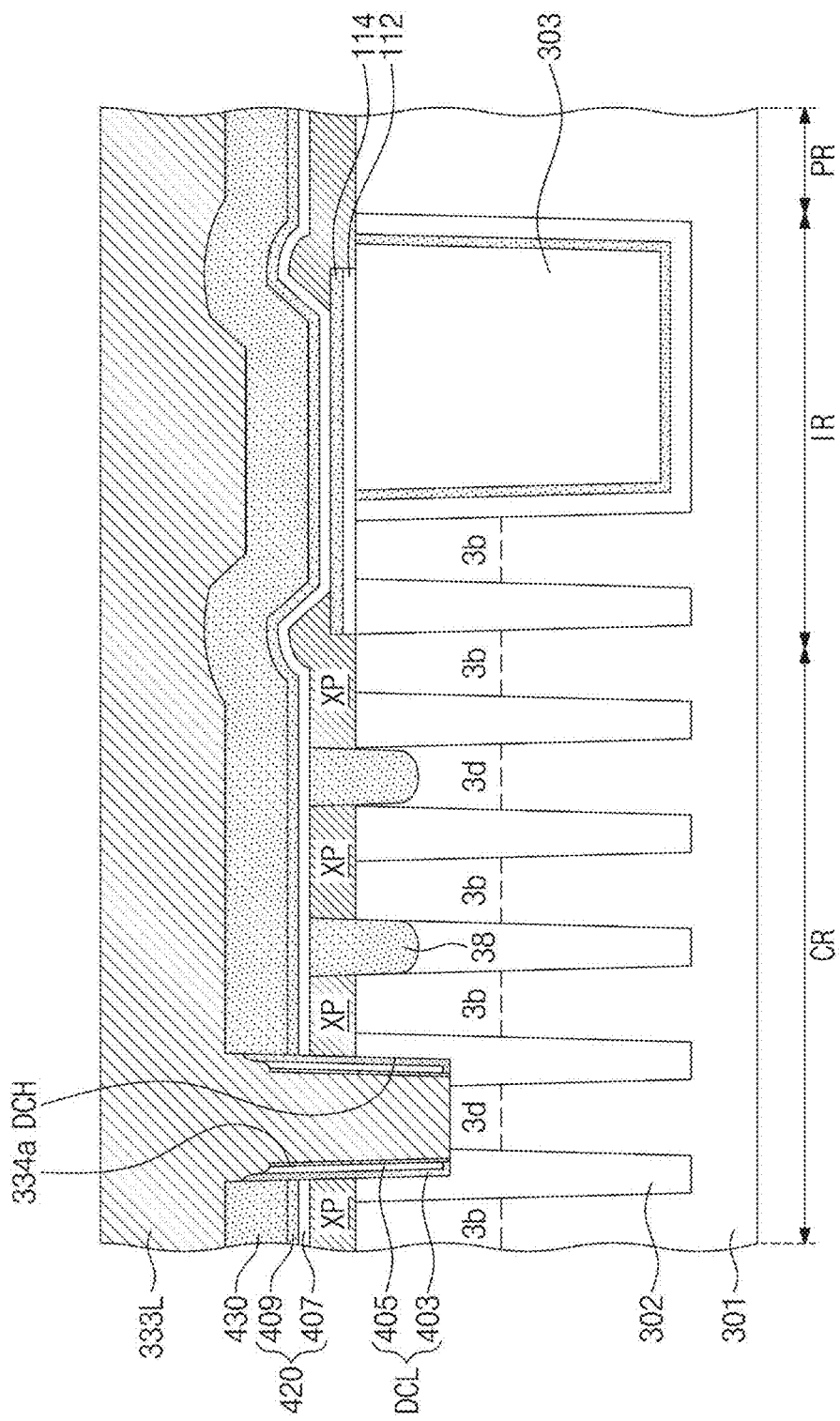
Figure 8C:
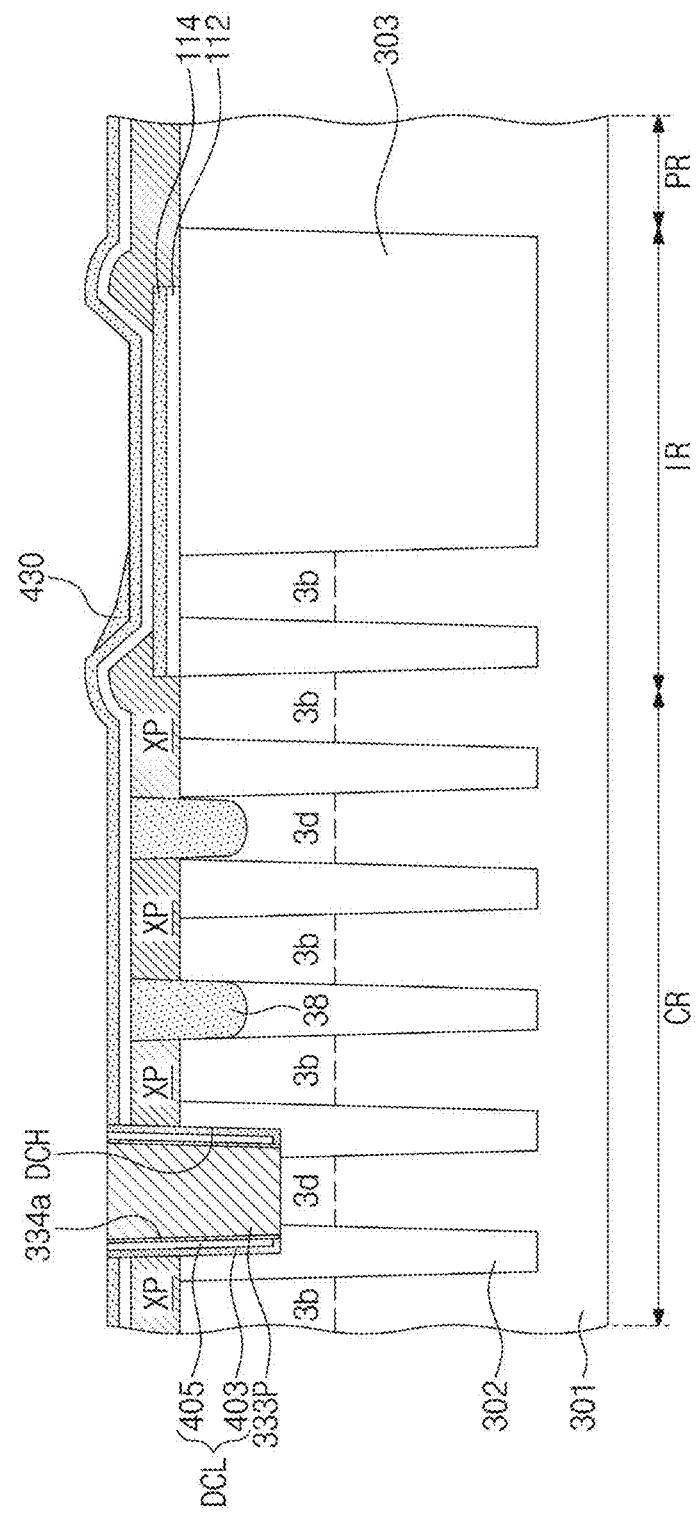

FIGS. 8A to 8C illustrate cross-sectional views showing a method of fabricating a semiconductor memory device according to some embodiments of inventive concepts.

Referring to FIG. 8A, an interlayer dielectric layer 420 may be formed on the conductive pattern 20p and the pad isolation pattern 38, and the interlayer dielectric layer 420 may include a first interlayer dielectric layer 407 and a second interlayer dielectric layer 409. A thick silicon nitride layer 430a may be formed directly on the second interlayer dielectric layer 409.

Afterwards, processes substantially identical to those of FIGS. 6C and 6D may be performed. Referring to FIG. 8B, a polysilicon layer 333L may be formed on the entire surface of the substrate 301.

Referring to FIG. 8C, a selective etching process (e.g., etch-back process) may be used to remove a portion of the polysilicon layer 333L. The etching process may be performed until the silicon nitride mask pattern 430 on the peripheral circuit region PR is exposed in a first place and the silicon nitride mask pattern 430 on the cell array region CR is exposed in a second place, thereby forming a polysilicon pattern 333P. The etching process of the polysilicon pattern 333P may be performed until a polysilicon material does not remain on the silicon nitride mask pattern 430, and in this procedure, the polysilicon pattern 333P may have a top surface at a level lower than that of a top surface of the interlayer dielectric layer 420. Afterwards, the silicon nitride mask pattern 430 may be removed. In this step, a portion of the silicon nitride mask pattern 430 may remain on the interface region IR. Afterwards, processes may be performed identically to those of FIGS. 6K, 6M to 6Q, and 3A.

Figure 9A:
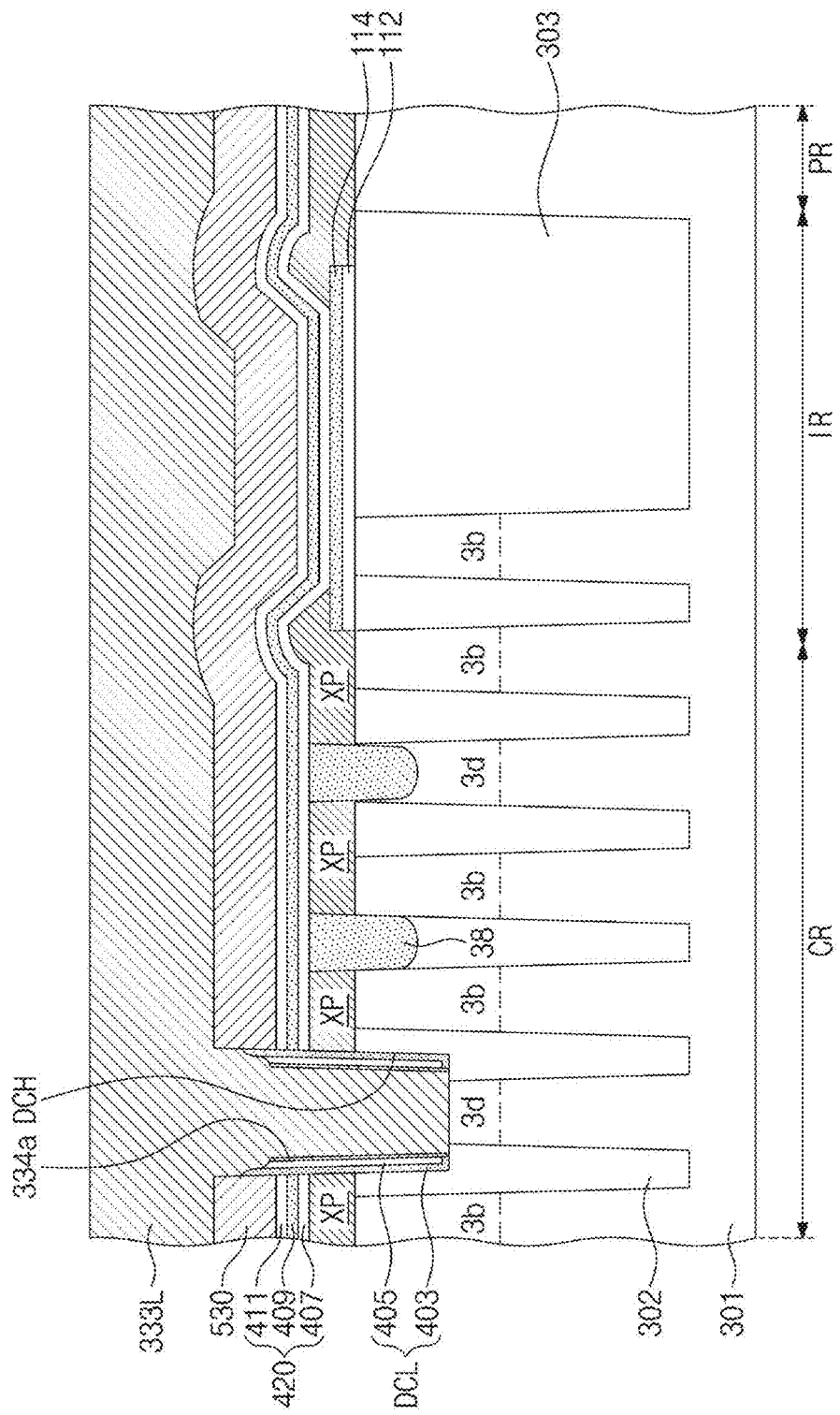
FIGS. 9A to 9C illustrate cross-sectional views showing a method of fabricating a semiconductor memory device according to a comparative example.
Figure 9B:
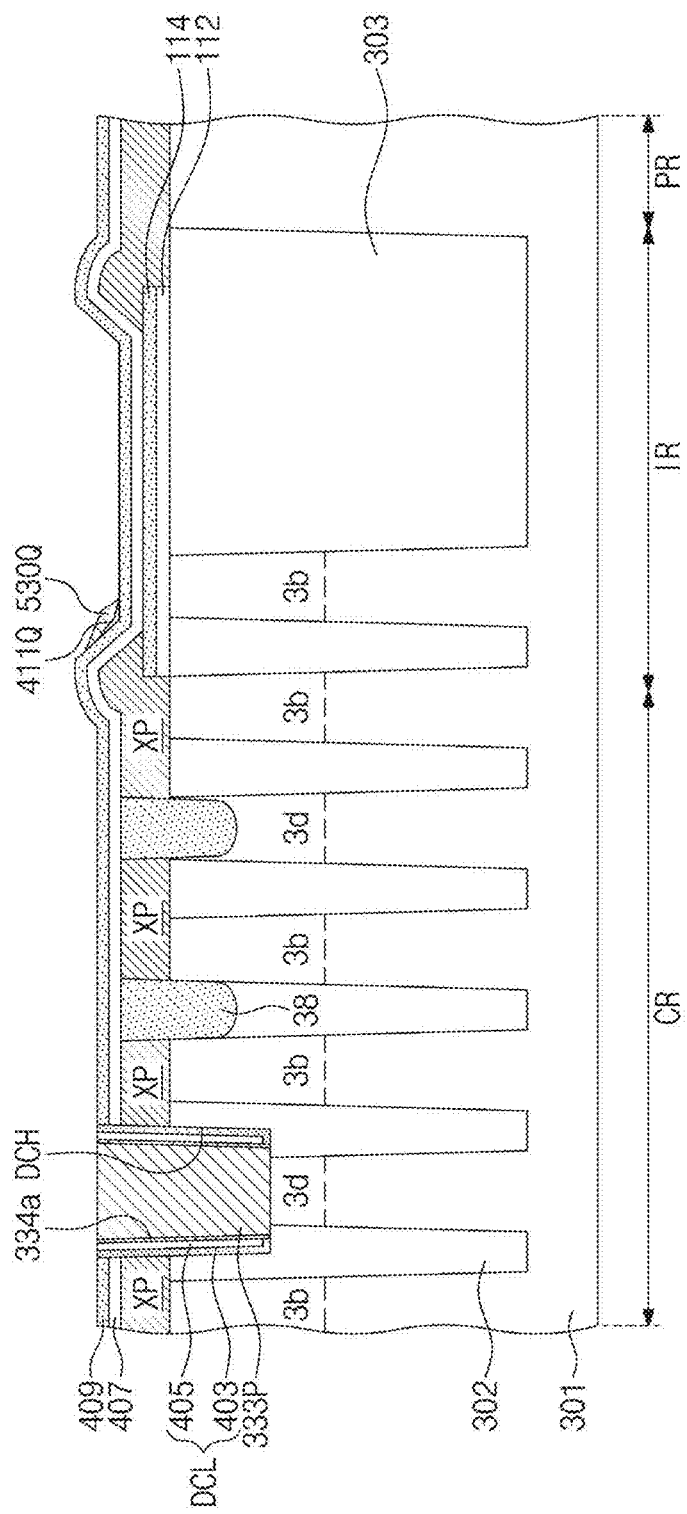
Figure 9C:
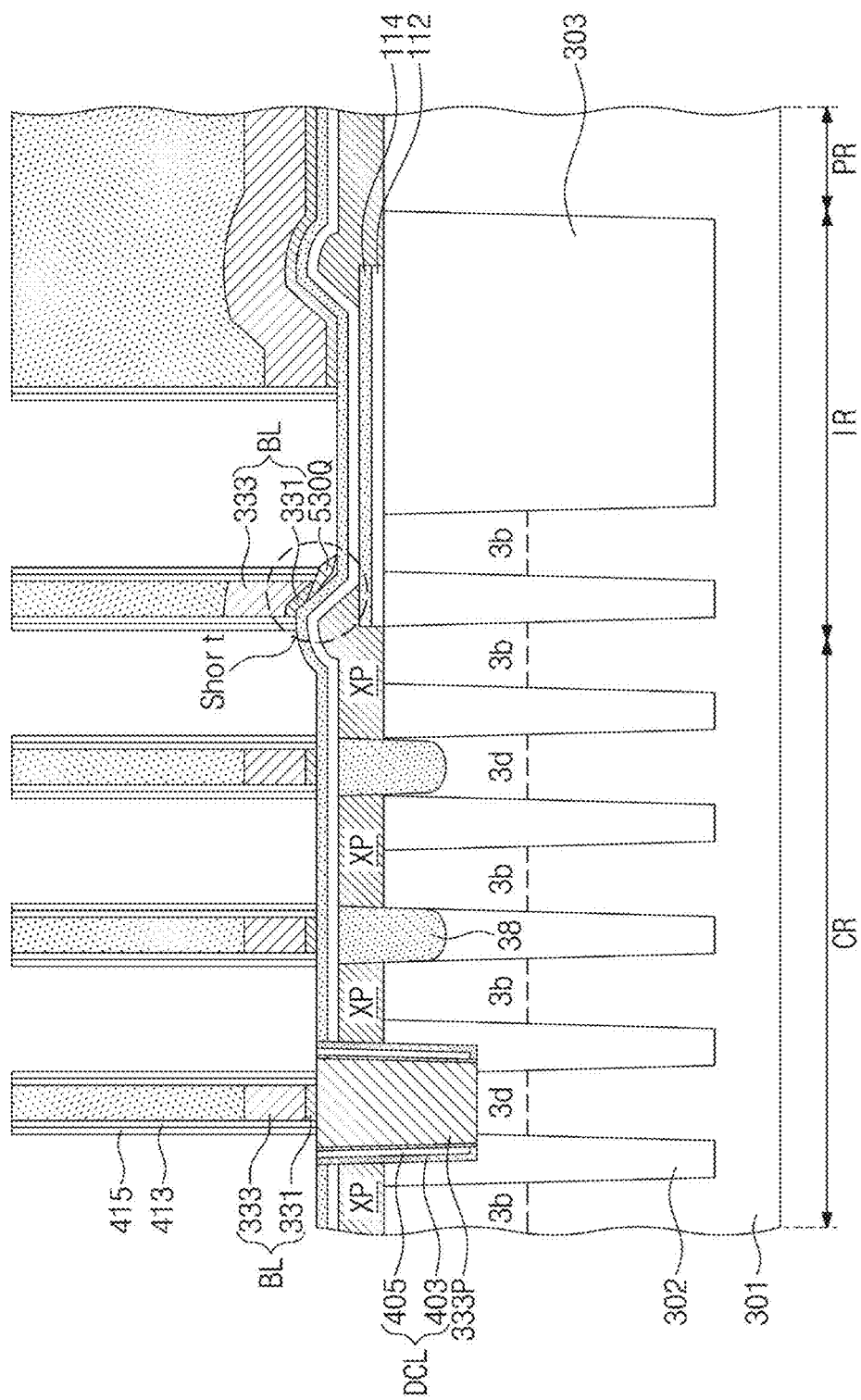

FIGS. 9A to 9C illustrate cross-sectional views showing a method of fabricating a semiconductor memory device according to a comparative example.

Referring to FIG. 9A, differently from some embodiments of inventive concepts, instead of the silicon nitride mask pattern 430, a polysilicon mask pattern 530 may be used as an etching mask.

Referring to FIG. 9B, in an etching process of the polysilicon layer 333L, the polysilicon mask pattern 530 and the polysilicon layer 333L may include the same material. The polysilicon mask pattern 530 may be used as an etching mask to etch the polysilicon layer 333L to form the polysilicon pattern 333P. The polysilicon mask pattern 530 may remain on the interface region IR even after the polysilicon pattern 333P is formed. For example, a residual polysilicon mask pattern 530Q may be present on the interface region IR. When an etching process is further performed to remove the residual polysilicon mask pattern 530Q, the interlayer dielectric layer 420 may be in danger of being damaged.

When the bit line BL is formed in a state that the residual polysilicon mask pattern 530Q is not removed on the interface region IR as shown in FIG. 9C, the residual polysilicon mask pattern 530Q and the bit line BL may be electrically connected to produce an electrical short.

In a method of fabricating a semiconductor memory device according to embodiments of inventive concepts, the silicon nitride mask pattern 430 may be used as an etching mask to form the contact hole DCH that exposes the first impurity region 3d. After the etching process, even when a residue of the silicon nitride mask pattern 430 is present on the interface region IR, the residue may exhibit non-conductivity to increase reliability of the semiconductor memory device. In addition, over-etching may be limited and/or prevented to protect the interlayer dielectric layer 420.

According to embodiments of inventive concepts, as neighboring first and second bit lines are located at different heights, a storage node contact interposed between the first and second bit lines may have a reduced portion that overlaps both of the first and second bit lines. As a result, there may be a reduction in parasitic capacitance between the first bit line and the second bit line.

In a method of fabricating a semiconductor memory device according to embodiments of inventive concepts, a silicon nitride mask pattern may be used as an etching mask to form a contact hole that exposes an impurity region. After an etching process, even after a residue of the silicon nitride mask pattern is present on an interface region, the residue may exhibit non-conductivity to increase reliability of the semiconductor memory device. In addition, over-etching may be limited and/or prevented to protect an interlayer dielectric layer.

The aforementioned description provides some embodiments for explaining inventive concepts. Therefore, inventive concepts are not limited to the embodiments described above, and it will be understood by one of ordinary skill in the art that variations in form and detail may be made therein without departing from the spirit and essential features of inventive concepts.

What is claimed is:

1. A semiconductor memory device, comprising:
a substrate;
a device isolation pattern in the substrate, the device isolation pattern defining a first active section of the substrate and a second active section of the substrate that are spaced apart from each other, a center of the first active section being adjacent to an end of the second active section;
a first bit line crossing the center of the first active section;
a second bit line crossing a center of the second active section;
a bit-line contact between the first bit line and the center of the first active section; and
a storage node pad on the end of the second active section, wherein a level of a bottom surface of the first bit line is lower than a level of a bottom surface of the second bit line.

2. The semiconductor memory device of claim 1, wherein the first bit line includes a first diffusion barrier pattern and a first bit-line wire pattern that are sequentially stacked, and the second bit line includes a second diffusion barrier pattern and a second bit-line wire pattern that are sequentially stacked.

3. The semiconductor memory device of claim 2, wherein a level of a bottom surface of the first diffusion barrier pattern is lower than a level of a bottom surface of the second diffusion barrier pattern.

4. The semiconductor memory device of claim 2, wherein a thickness of the first diffusion barrier pattern is equal to a thickness of the second diffusion barrier pattern.

5. The semiconductor memory device of claim 2, wherein the first diffusion barrier pattern and the second diffusion barrier pattern include a first metallic material, and the first bit-line wire pattern and the second bit-line wire pattern include a second metallic material.

6. The semiconductor memory device of claim 2, further comprising:
an interlayer dielectric layer between the substrate and the second bit line,
wherein the first diffusion barrier pattern is in contact with the bit-line contact, and
wherein the second diffusion barrier pattern is in contact with the interlayer dielectric layer.

7. The semiconductor memory device of claim 6, wherein the interlayer dielectric layer includes a first interlayer dielectric layer and a second interlayer dielectric layer that are sequentially stacked,
the first interlayer dielectric layer includes silicon oxide,
the second interlayer dielectric layer includes silicon nitride, and
the second diffusion barrier pattern is in contact with the second interlayer dielectric layer.

8. The semiconductor memory device of claim 6, further comprising:
a first bit-line polysilicon pattern between the first diffusion barrier pattern and the bit-line contact; and
a second bit-line polysilicon pattern between the second diffusion barrier pattern and the interlayer dielectric layer.

9. The semiconductor memory device of claim 1, further comprising:
a storage node contact between the first bit line and the second bit line, the storage node contact being adjacent to the storage node pad; and
an ohmic layer between the storage node contact and the storage node pad,
wherein a bottom surface of the ohmic layer is rounded.

10. The semiconductor memory device of claim 1, further comprising:
a pad isolation pattern, wherein
the bit-line contact is on one side of the storage node pad,
the pad isolation pattern is on an other side of the storage node pad, and
a bottom end of the pad isolation pattern is below a bottom end of the storage node pad.

11. A semiconductor memory device, comprising:
a substrate;
a device isolation pattern in the substrate, the device isolation pattern defining a first active section of the substrate and a second active section of the substrate that are spaced apart from each other, a center of the first active section being adjacent to an end of the second active section;
a first bit line crossing the center of the first active section;
a second bit line crossing a center of the second active section;

a bit-line contact between the first bit line and the center of the first active section; and a storage node pad on the end of the second active section, wherein a height of the first bit line from a top surface of the substrate is different from a height of the second bit line from the top surface of the substrate.

12. The semiconductor memory device of claim 11, wherein the first bit line is below the second bit line.

13. The semiconductor memory device of claim 11, wherein the first bit line includes a first diffusion barrier pattern and a first bit-line wire pattern that are sequentially stacked, and the second bit line includes a second diffusion barrier pattern and a second bit-line wire pattern that are sequentially stacked, the first diffusion barrier pattern and the second diffusion barrier pattern include at least one of titanium, titanium nitride (TiN), titanium silicon nitride (TiSiN), tantalum, tantalum nitride, and tungsten nitride, and the first bit-line wire pattern and the second bit-line wire pattern include at least one of tungsten, aluminum, copper, ruthenium, and iridium.

14. The semiconductor memory device of claim 13, further comprising:

an interlayer dielectric layer between the substrate and the second bit line;

a first bit-line polysilicon pattern between the first diffusion barrier pattern and the bit-line contact; and a second bit-line polysilicon pattern between the second diffusion barrier pattern and the interlayer dielectric layer.

15. The semiconductor memory device of claim 11, wherein the first bit line and the second bit line have a same length along a direction perpendicular to the top surface of the substrate.

16. The semiconductor memory device of claim 11, further comprising:

a pad isolation pattern, wherein the bit-line contact is on one side of the storage node pad, the pad isolation pattern is on an other side of the storage node pad, and a top surface of the pad isolation pattern and a top surface of the storage node pad are coplanar with each other.

17. The semiconductor memory device of claim 16, wherein the second bit line vertically overlaps the pad isolation pattern.

18. A semiconductor memory device, comprising:

a substrate including a cell array region and an interface region;

a device isolation pattern on the cell array region, the device isolation pattern defining a first active section of the substrate, a second active section of the substrate, and a third active section of the substrate, the first active section, the second active section, and the third active section being spaced apart from each other, a center of the first active section being adjacent to an end of the second active section, and the third active section being adjacent to the interface region;

a first bit line crossing the center of the first active section;

a second bit line crossing a center of the second active section;

a third bit line crossing a center of the third active section;

a bit-line contact between the first bit line and the center of the first active section;

a first storage node pad on the end of the second active section; and a second storage node pad on an end of the third active section, wherein a thickness of the second storage node pad is greater than a thickness of the first storage node pad, and wherein a level of a bottom surface of the first bit line is lower than a level of a bottom surface of the second bit line.

19. The semiconductor memory device of claim 18, wherein the first bit line and the second bit line have a same length along a direction perpendicular to a top surface of the substrate.

20. The semiconductor memory device of claim 18, wherein the first bit line is below the second bit line.

* * * * *